US011648956B2

(12) United States Patent
Caron et al.

(10) Patent No.: US 11,648,956 B2
(45) Date of Patent: *May 16, 2023

(54) VEHICULAR CABIN MONITORING SYSTEM

(71) Applicant: Magna Mirrors of America, Inc., Holland, MI (US)

(72) Inventors: Stephen J. Caron, Aurora (CA); Wassim Rafrafi, Newmarket (CA)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 4 days.

This patent is subject to a terminal disclaimer.

(21) Appl. No.: 17/453,901

(22) Filed: Nov. 8, 2021

(65) Prior Publication Data

US 2022/0063647 A1    Mar. 3, 2022

Related U.S. Application Data

(63) Continuation of application No. 16/240,130, filed on Jan. 4, 2019, now Pat. No. 11,167,771.

(Continued)

(51) Int. Cl.
*B60W 50/10* (2012.01)
*G01S 7/41* (2006.01)
(Continued)

(52) U.S. Cl.
CPC ............ *B60W 50/10* (2013.01); *B60W 40/08* (2013.01); *B60W 50/14* (2013.01); *G01S 7/41* (2013.01);
(Continued)

(58) Field of Classification Search
CPC ...... B60W 50/10; B60W 40/08; B60W 50/14; B60W 2040/089; B60W 2050/146; B60W 2420/52; B60W 2540/21; B60W 2710/06; B60W 2710/30; G01S 7/41; G01S 7/415; G01S 13/88; G01S 2013/9327;
(Continued)

(56) References Cited

U.S. PATENT DOCUMENTS 6,587,186 B2   7/2003   Bamji et al.
6,674,895 B2   1/2004   Rafii et al.
(Continued)

FOREIGN PATENT DOCUMENTS

JP   2018163668 A   10/2018
KR   101588184 B1   1/2016

*Primary Examiner* — Richard M Camby
(74) *Attorney, Agent, or Firm* — Honigman LLP

(57) ABSTRACT

A vehicular cabin monitoring system includes a radar assembly disposed in a cabin of a vehicle and operable to capture radar data. The radar assembly is housed in an interior rearview mirror assembly of the vehicle and includes at least one radar transmit antenna that is operable to transmit radar waves and at least one radar receive antenna that is operable to receive radar waves. A control includes a data processor for processing radar data captured by the radar assembly. The control, via processing at the data processor of radar data captured by the radar assembly, detects movement of a body part of an occupant present in the cabin of the vehicle. The control, responsive to detecting movement of the body part of the occupant in the cabin of the vehicle, generates a control command associated with at least one operation of the vehicle.

40 Claims, 17 Drawing Sheets

Related U.S. Application Data

(60) Provisional application No. 62/613,837, filed on Jan. 5, 2018.

(51) Int. Cl.

| | | |
|---|---|---|
| *B60W 40/08* | (2012.01) | |
| *B60W 50/14* | (2020.01) | |
| *G06F 3/01* | (2006.01) | |
| *G06F 3/04886* | (2022.01) | |
| *G06F 3/16* | (2006.01) | |
| *G01S 13/88* | (2006.01) | |
| *G10L 15/22* | (2006.01) | |
| *G01S 13/931* | (2020.01) | |

(52) U.S. Cl.
CPC .............. *G01S 7/415* (2013.01); *G01S 13/88* (2013.01); *G06F 3/012* (2013.01); *G06F 3/017* (2013.01); *G06F 3/04886* (2013.01); *G06F 3/167* (2013.01); *B60W 2040/089* (2013.01); *B60W 2050/146* (2013.01); *B60W 2420/52* (2013.01); *B60W 2540/21* (2020.02); *B60W 2710/06* (2013.01); *B60W 2710/30* (2013.01); *G01S 2013/9327* (2020.01); *G06F 2203/0381* (2013.01); *G10L 15/22* (2013.01)

(58) Field of Classification Search
CPC ...... G06F 3/012; G06F 3/017; G06F 3/04886; G06F 3/167; G06F 2203/0381; G10L 15/22
See application file for complete search history.

(56) References Cited

U.S. PATENT DOCUMENTS

| | | |
|---|---|---|
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,405,120 B2 | 8/2016 | Graf et al. |
| 9,575,160 B1 | 2/2017 | Davis et al. |
| 9,575,560 B2 * | 2/2017 | Poupyrev ................ G01S 13/89 |
| 9,599,702 B1 | 3/2017 | Bordes et al. |
| 9,689,967 B1 | 6/2017 | Stark et al. |
| 9,753,121 B1 | 9/2017 | Davis et al. |
| 9,811,164 B2 * | 11/2017 | Poupyrev ................ G01S 7/415 |
| 9,817,109 B2 * | 11/2017 | Saboo ................... G01S 13/584 |
| 10,459,080 B1 * | 10/2019 | Schwesig ............... G06N 20/00 |
| 10,609,148 B1 * | 3/2020 | Tran ....................... B60W 40/09 |
| 11,167,771 B2 | 11/2021 | Caron et al. |
| 2010/0231436 A1 | 9/2010 | Focke et al. |
| 2010/0245066 A1 | 9/2010 | Sarioglu et al. |
| 2013/0124038 A1 * | 5/2013 | Naboulsi ............. B60R 11/0264 |
| | | 701/36 |
| 2013/0261871 A1 | 10/2013 | Hobbs et al. |
| 2014/0309878 A1 | 10/2014 | Ricci |
| 2014/0336876 A1 | 11/2014 | Gieseke et al. |
| 2015/0009010 A1 | 1/2015 | Biemer |
| 2015/0015710 A1 * | 1/2015 | Tiryaki ................... G06F 3/0304 |
| | | 348/148 |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 * | 10/2015 | Wacquant ............... G06F 3/012 |
| | | 348/207.11 |
| 2015/0352953 A1 | 12/2015 | Koravadi |
| 2016/0137126 A1 | 5/2016 | Fursich et al. |
| 2016/0209647 A1 | 7/2016 | Fursich |
| 2016/0259037 A1 * | 9/2016 | Molchanov ........ G06K 9/00355 |
| 2017/0222311 A1 | 8/2017 | Hess et al. |
| 2017/0254873 A1 | 9/2017 | Koravadi |
| 2017/0267169 A1 * | 9/2017 | Fleurence ............... G01S 13/88 |
| 2017/0274906 A1 | 9/2017 | Hassan et al. |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0046255 A1 * | 2/2018 | Rothera ................ B60K 35/00 |
| 2018/0196501 A1 * | 7/2018 | Trotta ..................... H04W 4/70 |
| 2018/0222414 A1 | 8/2018 | Ihlenburg et al. |
| 2018/0231635 A1 | 8/2018 | Woehlte |
| 2019/0018364 A1 * | 1/2019 | Kim ....................... G03H 1/024 |
| 2019/0339382 A1 | 11/2019 | Hess et al. |

* cited by examiner

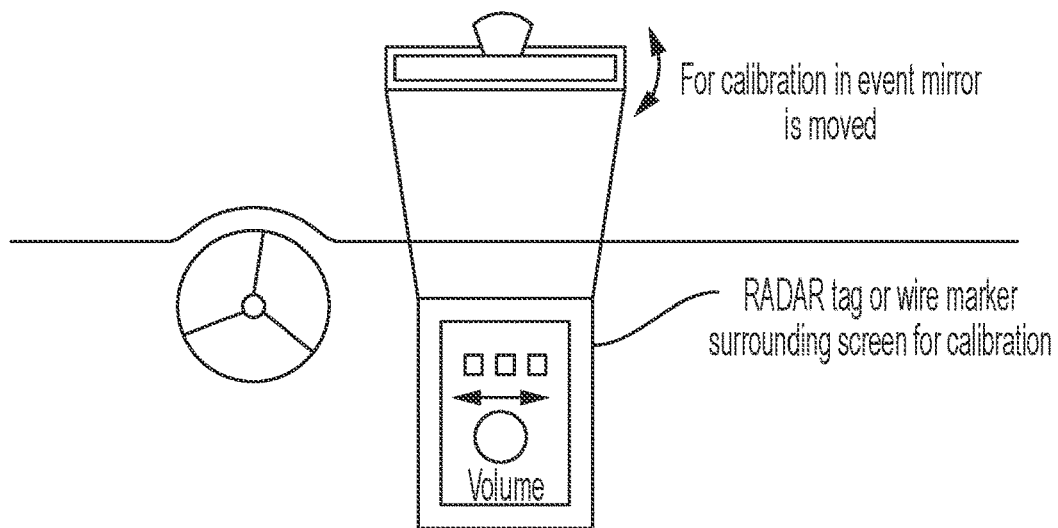
FIG. 13
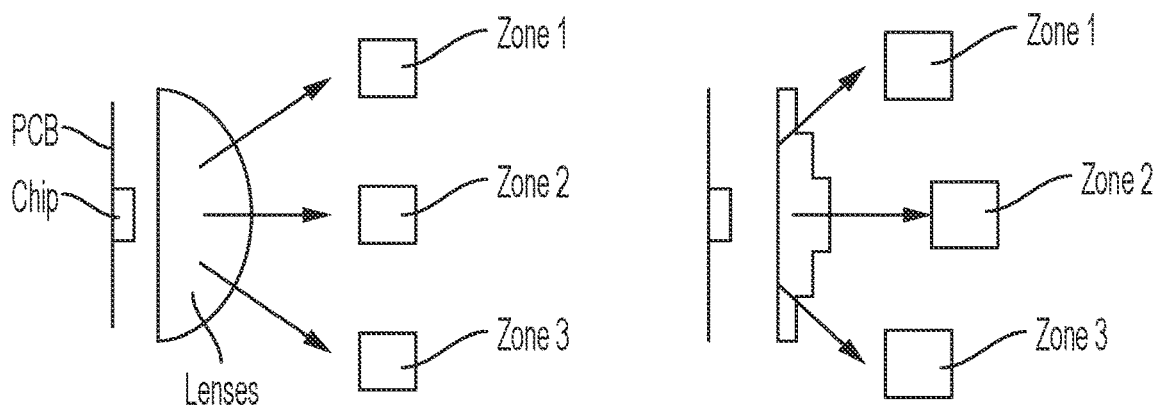
FIG. 14A
FIG. 14B
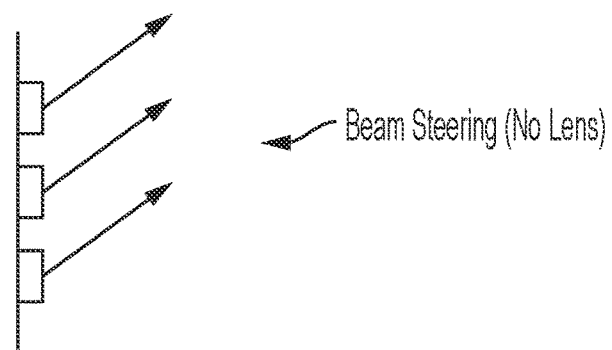
FIG. 14C

VEHICULAR CABIN MONITORING SYSTEM

CROSS REFERENCE TO RELATED APPLICATIONS

The present application is a continuation of U.S. patent application Ser. No. 16/240,130, filed Jan. 4, 2019, now U.S. Pat. No. 11,167,771, which claims the filing benefits of U.S. provisional application Ser. No. 62/613,837, filed Jan. 5, 2018, which is hereby incorporated herein by reference in its entirety.

FIELD OF THE INVENTION

The present disclosure relates generally to radar assemblies for motor vehicles and, more particularly, to a radar assembly with multifunction sensing functionality.

BACKGROUND OF THE INVENTION

This section provides background information related to the present disclosure which is not necessarily prior art.

Passengers can interact with vehicle controllers with a myriad of user interface and sensing technologies in cabins of current vehicles. These user interface and sensing technologies include switches and buttons, capacitive touch sensors, speech recognition, vision/cameras, and touchscreens. Each of these technologies has developed based on specialized detection abilities. For example, buttons and switches or corresponding capacitive touch sensors can easily be utilized in a cabin of a vehicle to allow passengers to operate vehicle functions, such as window regulators, power side mirrors, infotainment systems, and heating, ventilation and air conditioning systems. Yet, numerous buttons and switches or capacitive touch sensors commonly found on vehicles can add weight to the vehicle and take up valuable space in the cabin.

While speech recognition systems are increasingly also used to allow passengers of the vehicle to provide input to control operations of the vehicle, other sounds in the cabin, such as road noise and loud music can reduce the effectiveness of such systems. Furthermore, speech recognition systems typically utilize at least one microphone or even complicated arrays of microphones that must be packaged and wired in the vehicle.

In general, such conventional technologies can be effective at recognizing user intentions and commands in various ways; however, their implementation can often lead to complex systems with many necessary parts and complicated control methodologies due to the need to process inputs from the various user interface and sensing systems. Thus, user interface and sensing systems which are currently available could be improved.

SUMMARY OF THE INVENTION

This section provides a general summary of the present disclosure and is not a comprehensive disclosure of its full scope or all of its features, aspects and objectives.

Accordingly, it is an aspect of the present disclosure to provide a radar assembly with multifunction sensing functionality for a vehicle. The radar assembly includes at least one radar transmit antenna for transmitting radar waves in a cabin of the vehicle and exterior areas outside the cabin. The radar assembly also includes at least one radar receive antenna for receiving the radar waves in the cabin of the vehicle after reflection from at least one of the exterior areas and the cabin and passengers in the vehicle in a plurality of hotspot zones. A timing controller includes at least one processing control input and at least one timing control output that is electrically coupled to the at least one radar transmit antenna for generating a transmit output signal utilized for the transmission of the radar waves. The timing controller also includes at least one timing control input electrically coupled to the at least one radar receive antenna for receiving a receive input signal corresponding to the radar waves received by the at least one radar receive antenna. A memory unit is electrically coupled to the timing controller for storing a plurality of stored parameters and data corresponding to radar waves received by the at least one radar receive antenna. A control or microcontroller is electrically coupled to the processing control input of the timing controller and storing a series of instructions and electrically coupled to a vehicle communication bus for communicating with a plurality of vehicle controllers. The microcontroller is configured to execute the series of instructions to operate the timing controller. The microcontroller processes the data corresponding to the radar waves received by the at least one radar receive antenna to scan the cabin and exterior areas for detecting motion and gestures made by the passenger in the plurality of hotspot zones.

According to another aspect of the disclosure, a system for multifunction sensing in a vehicle is also provided. The system includes a radar assembly with multifunction sensing functionality including at least one radar transmit antenna for transmitting radar waves in a cabin of the vehicle and exterior areas outside the cabin. The radar assembly also includes at least one radar receive antenna for receiving the radar waves in the cabin of the vehicle after reflection from at least one of the exterior areas and the cabin and passengers in the vehicle in a plurality of hotspot zones. A plurality of markers representing button controls are disposed in at least one of the cabin of the vehicle and the exterior areas. The radar assembly includes a microcontroller electrically coupled to the at least one radar transmit antenna and the at least one radar receive antenna and storing a series of instructions. The microcontroller is in communication with a plurality of vehicle controllers and is configured to execute the series of instructions to operate the at least one radar transmit antenna for the transmission of the radar waves. The microcontroller is also configured to recognize the plurality of markers and process data corresponding to the radar waves received by the at least one radar receive antenna for detecting motion and gestures made by the passenger in the plurality of hotspot zones. The microcontroller is also configured to identify the motion and gestures made by the passenger adjacent to the plurality of markers. Additionally, the microcontroller is configured to correlate the motion and gestures made by the passenger to a plurality of marker operations associated with the plurality of markers. The microcontroller is also configured to communicate a plurality of marker control commands corresponding to the plurality of marker operations to the plurality of vehicle controllers in response to correlating the motion and gestures made by the passenger to the plurality of marker operations.

It is another aspect of the present disclosure to provide a method of sensing user interactions using a radar assembly with multifunction sensing functionality in a vehicle. The method includes the step of operating a timing controller using a microcontroller electrically coupled to the timing controller. The next step of the method is generating a transmit output signal utilized for the transmission of radar waves using at least one timing control output of the timing controller. Next, the method includes the step of transmitting radar waves in a cabin of the vehicle and exterior areas outside the cabin using at least one radar transmit antenna to scan the cabin and exterior areas. The method proceeds with the step of receiving the radar waves in the cabin of the vehicle after reflection from at least one of the exterior areas and the cabin and passengers in the vehicle in a plurality of hotspot zones using at least one radar receive antenna. The method continues by receiving a receive input signal corresponding to the radar waves received by the at least one radar receive antenna using at least one timing control input of the timing controller. The method also includes the step of storing a plurality of stored parameters and data corresponding to radar waves received by the at least one radar receive antenna using a memory unit electrically coupled to the timing controller. The method continues with the step of processing the data corresponding to the radar waves received by the at least one radar receive antenna using the microcontroller. Next, detecting motion and gestures made by the passenger in the plurality of hotspot zones using the microcontroller. The method then includes the step of communicating with a plurality of vehicle controllers in response to detecting the motion and gestures made by the passenger in the plurality of hotspot zones.

The system and radar assembly for multifunction sensing according to the present disclosure provides numerous benefits, which are especially attractive to the passenger of the vehicle. As radar technology improves, the ability to recognize precise gestures in higher resolution allows for combining numerous interfaces into a single integrated unit or radar assembly to sense human interfacing requests.

These and other aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

Other advantages of the present disclosure will be readily appreciated, as the same becomes better understood by reference to the following detailed description when considered in connection with the accompanying drawings wherein:

FIGS. 10, 11, and 12A-1 to 12B-2 are flow charts illustrating steps of a method of sensing user interactions using a radar assembly with multifunction sensing functionality according to aspects of the disclosure;

FIG. 13 illustrates an interior rearview mirror and a screen that calibrates using the interior rearview mirror according to aspects of the disclosure;

FIGS. 14A-14C illustrates radar focusing lenses and radar beam steering with and without lenses according to aspects of the disclosure.

DETAILED DESCRIPTION OF THE PREFERRED EMBODIMENTS

In the following description, details are set forth to provide an understanding of the present disclosure. In some instances, certain circuits, structures and techniques have not been described or shown in detail in order not to obscure the disclosure.

In general, a radar assembly with multifunction sensing functionality and a corresponding system constructed in accordance with the teachings of the present disclosure will now be disclosed. A method of sensing user interactions using the radar assembly with multifunction sensing functionality constructed in accordance with the teachings of the present disclosure will also be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

Figure 1:
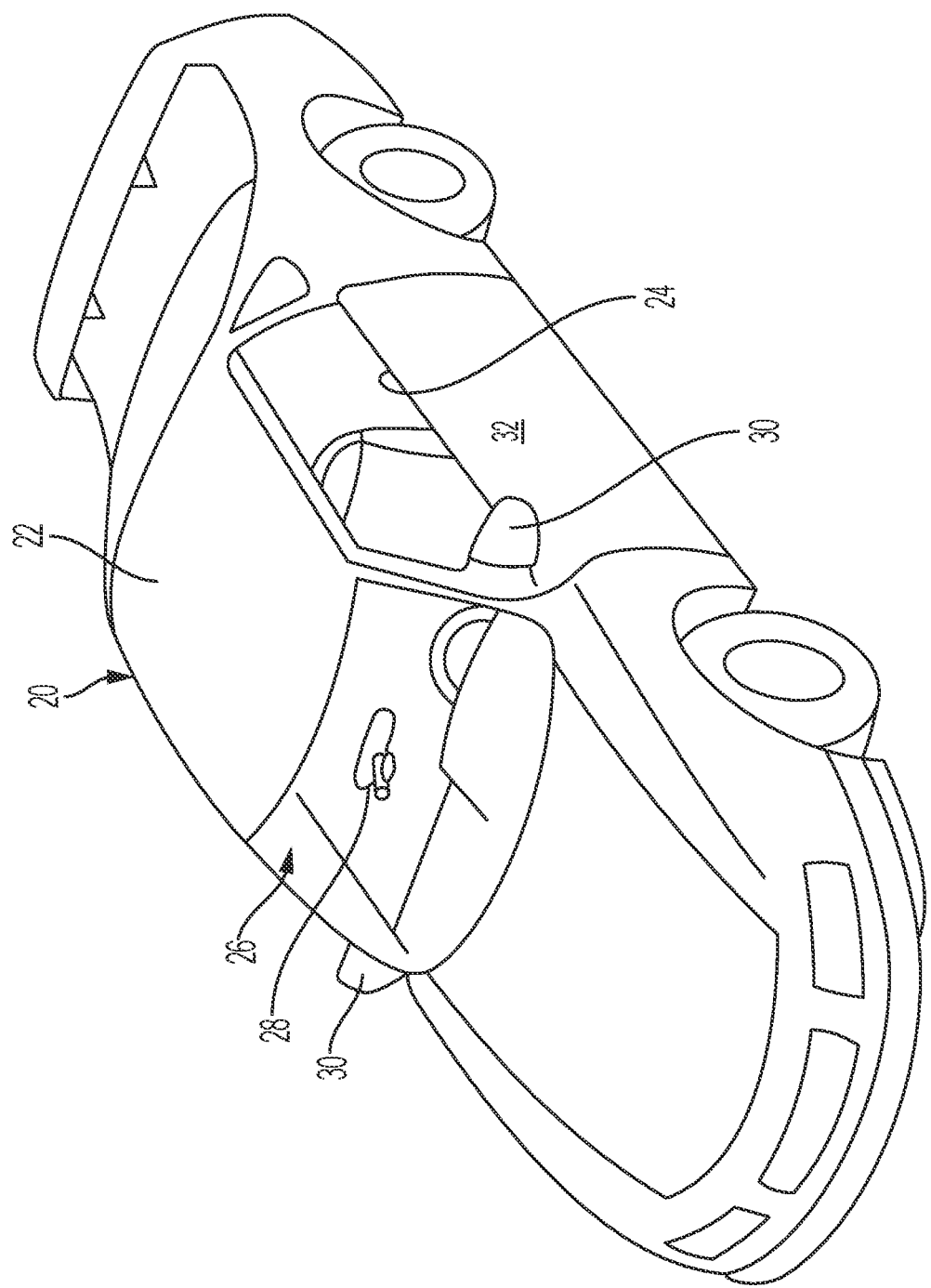
FIG. 1 is a perspective view of an example motor vehicle equipped with a radar assembly according to aspects of the disclosure.

Referring initially to FIG. 1, an example motor vehicle 20 is shown to include an exterior 22 and an interior defining a cabin 24. The vehicle 20 includes a windshield 26 and an interior rearview mirror assembly 28 attached thereto. The vehicle 20 can additionally include side mirrors 30 mounted to the exterior 22 on side doors 32 of the vehicle 20. The cabin 24 of the vehicle 20 can define numerous surfaces for user interface controls (e.g., window controls on an arm rest).

Figure 2:
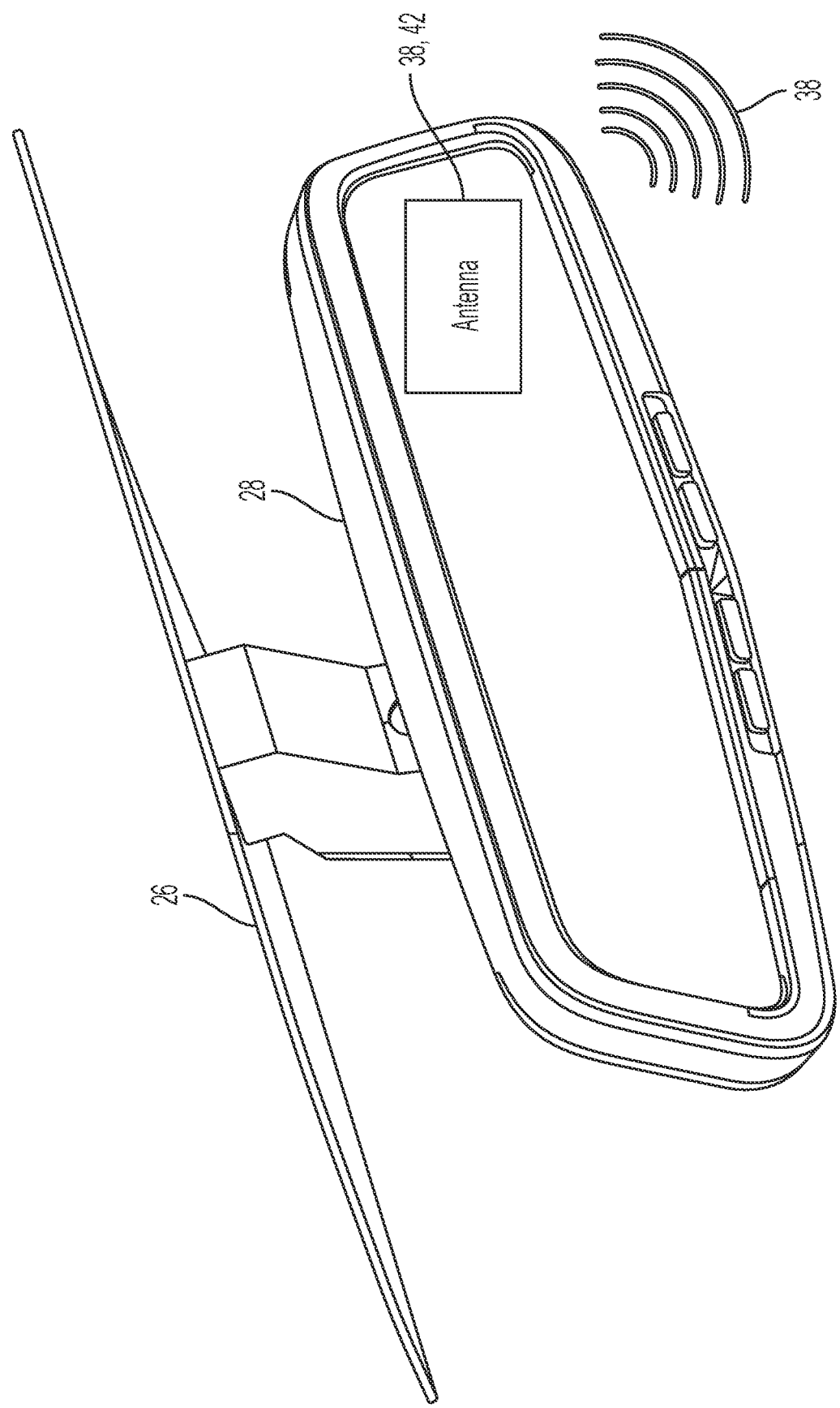
FIG. 2 is an enlarged perspective view of the radar assembly of FIG. 1 according to aspects of the disclosure.
Figure 3:
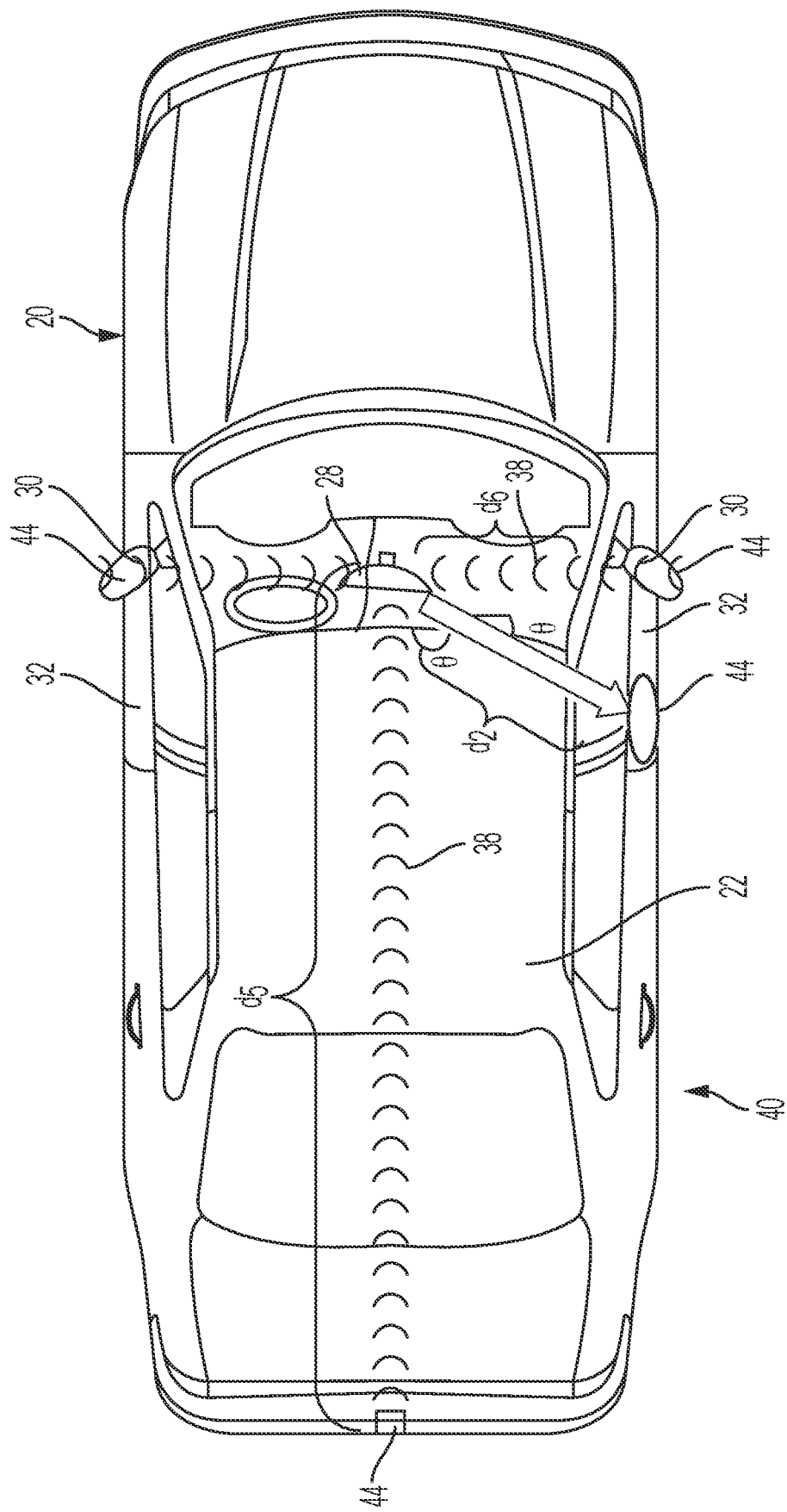
FIG. 3 is a top view of the vehicle of FIG. 1 illustrating radar waves from the radar assembly of FIG. 2 according to aspects of the disclosure.
Figure 4:
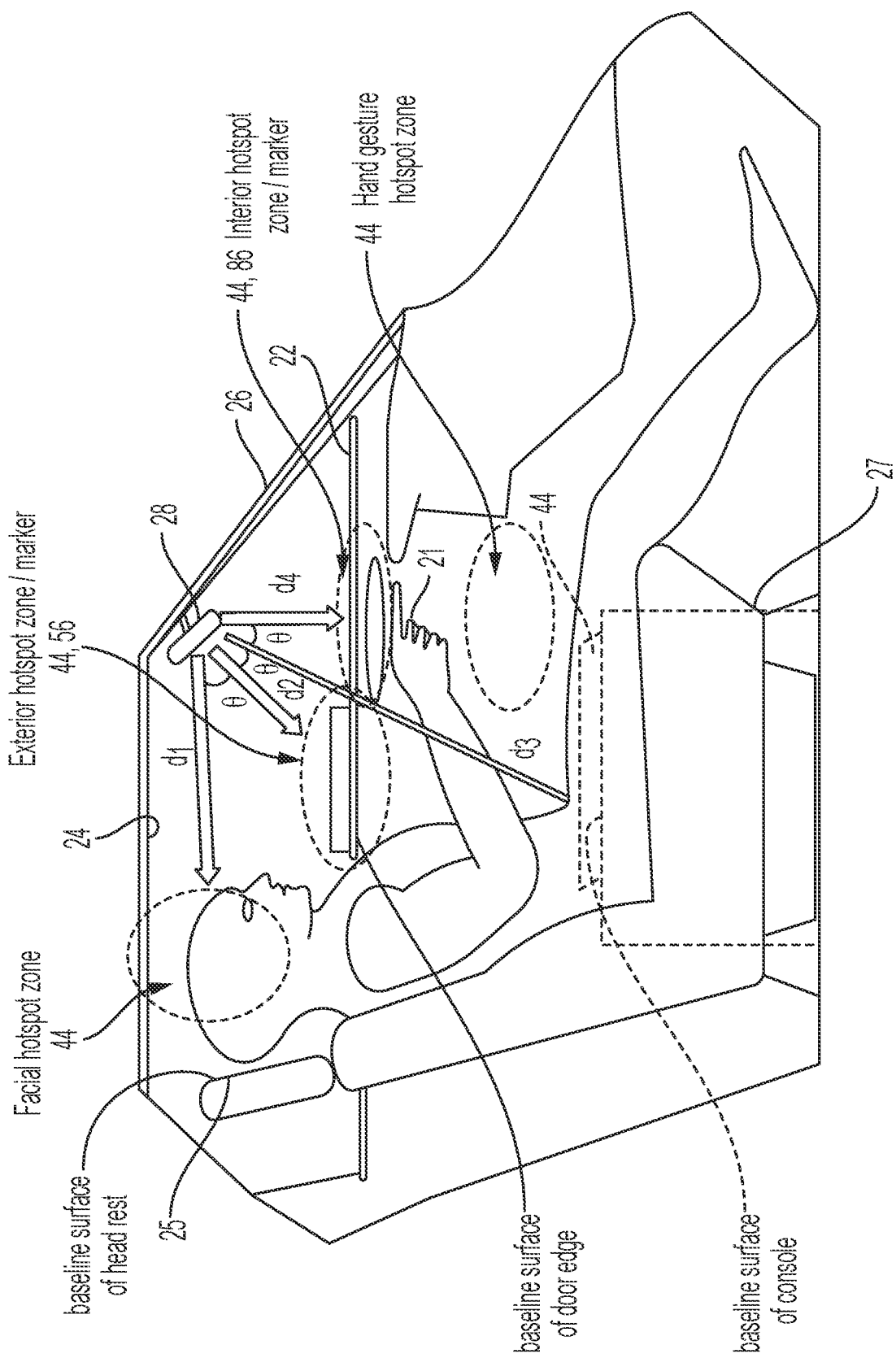
FIG. 4 is a partial cross-section of the vehicle of FIG. 1 illustrating a plurality of hotspot zones in a cabin of the vehicle and outside the cabin according to aspects of the disclosure.

The vehicle 20 includes a system 34 for multifunction sensing. The system 34 includes a radar assembly 28 with multifunction sensing functionality. According to an aspect, the radar assembly 28 can be disposed at or in the rearview mirror assembly 28 of the vehicle 20, as best shown in FIG. 2 (such as in the mirror head of the mirror assembly and behind the mirror reflective element, such as a prismatic mirror reflective element or an electro-optic or electrochromic mirror reflective element, and encased by the plastic mirror casing). In other words, the radar assembly 28 is a combination rearview mirror integrated with radar sensing capability. By integrating the radar sensing with the rear view mirror, the radar assembly 28 can be concealed within the rear view mirror unit, while also providing a pre-existing mounting point at a vantage point within the cabin 24 to allow for radar sensing for scanning and mapping the cabin 24, as well as zones exterior 22 to the cabin 24, as best shown in FIGS. 3 and 4. However, it should be understood that the radar assembly 28 could be separate from the rearview mirror assembly 28.

Figure 5:
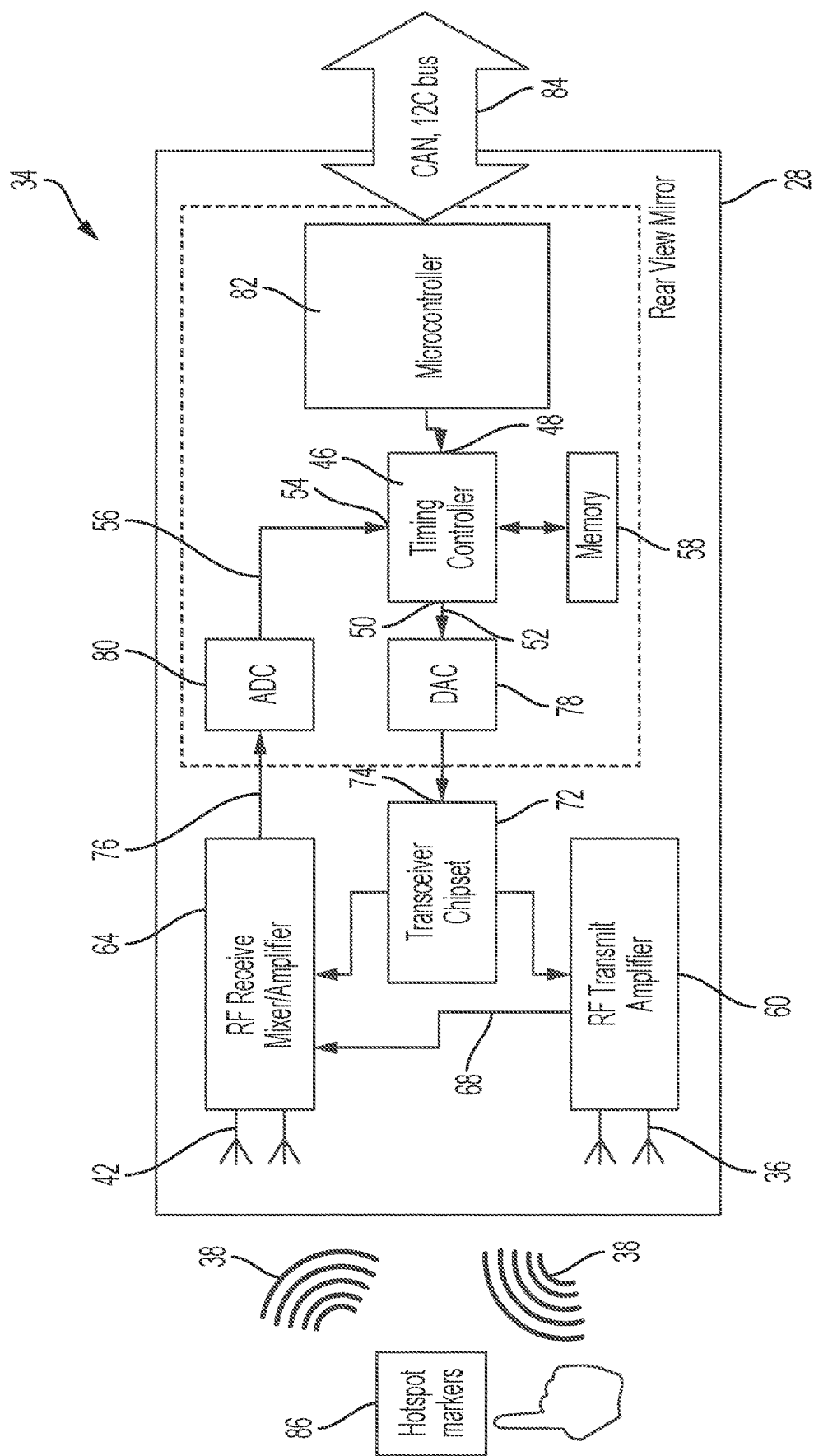
FIG. 5 is a block diagram of a system including the radar assembly of FIG. 2 and a plurality of markers according to aspects of the disclosure.

As shown in FIG. 5, the radar assembly 28 includes at least one radar transmit antenna 36 for transmitting radar waves 38 in the cabin 24 of the vehicle 20 and at exterior areas 40 outside the cabin 24 (e.g., near the side mirrors 30 or at the rear of the vehicle 20). The radar assembly 28 also includes at least one radar receive antenna 42 for receiving the radar waves 38 in the cabin 24 of the vehicle 20 after reflection from at least one of the exterior areas 40 and from in the cabin 24 and passengers in the vehicle 20 in a plurality of hotspot zones 44.

The at least one radar transmit antenna 36 can be configured to emit continuously modulated radiation, ultra-wide-band radiation, or sub-millimeter-frequency radiation (e.g., frequencies forming part of the ISM frequency band about 24 GHz). The continuously emitted radiation by the at least one radar transmit antenna 36, or continuous wave (CW) radar, known in the art to use Doppler radar, is employed in the radar assembly and system with multifunction sensing functionality. The modulated emitted radiation by the at least one radar transmit antenna 36, or frequency modulated continuous wave (FMCW) radar, also known in the art to use Doppler radar, may also be employed in the radar assembly and system with multifunction sensing functionality. Also, the system may be configured for use of pulsed based time-of-flight radar techniques.

The radar assembly 28 includes a timing controller 46 having at least one processing control input 48 and at least one timing control output 50 that is electrically coupled to the at least one radar transmit antenna 36 for generating a transmit output signal 52 utilized for the transmission of the radar waves 38. The timing controller 46 also includes at least one timing control input 54 electrically coupled to the at least one radar receive antenna 42 for receiving a receive input signal 56 corresponding to the radar waves 38 received by the at least one radar receive antenna 42. A memory unit 58 is electrically coupled to the timing controller 46 for storing a plurality of stored parameters and data corresponding to radar waves 38 received by the at least one radar receive antenna 42.

The radar assembly 28 also includes a transmit radio frequency amplifier 60 electrically coupled to the at least one radar transmit antenna 36 for receiving and amplifying the transmit output signal 52 for the at least one radar transmit antenna 36. Similarly, a receive radio frequency mixer and amplifier 64 is electrically coupled to the at least one radar receive antenna 42 for receiving and amplifying the radar waves 38 reflected from the at least one of the exterior areas 40 and the cabin 24 and passengers in the vehicle 20. The receive radio frequency mixer and amplifier 64 outputs the receive input signal 56 corresponding to the radar waves 38 received by the at least one radar receive antenna 42. Additionally, the transmit radio frequency amplifier 60 is electrically coupled to the receive radio frequency mixer and amplifier 64 for outputting a mixer output 68 to the receive radio frequency mixer and amplifier 64.

In addition, the radar assembly 28 also includes a transceiver chipset 72 including a transceiver input 74 coupled to the timing controller 46 and a plurality of transceiver outputs 70 electrically coupled to the transmit radio frequency amplifier 60 and the receive radio frequency mixer and amplifier 64. The transceiver chipset 72 transmits the transmit output signal 52 to the transmit radio frequency amplifier 60 and controls the transmit radio frequency amplifier 60 and the receive radio frequency mixer and amplifier 64.

Because the timing controller 46 operates with digital signals, the radar assembly 28 also includes a digital to analog converter 78 electrically coupled to the at least one timing control output 50 and to the transceiver input 74 for converting the transmit output signal 52 from the timing controller 46 to an analog transmit output signal 52. An analog to digital converter 80 is electrically coupled to the at least one timing control input 54 and to the receive radio frequency mixer and amplifier 64 for converting the analog received radar signal 76 to the receive input signal 56.

The radar assembly 28 includes a control or microcontroller 82 electrically coupled to the processing control input 48 of the timing controller 46 and storing a series of instructions and electrically coupled to a vehicle communication bus 84 (e.g., controller area network or I2C) for communicating with a plurality of vehicle controllers (not shown). The microcontroller 82 is configured to execute the series of instructions to operate the timing controller 46. The microcontroller 82 processes the data corresponding to the radar waves 38 received by the at least one radar receive antenna 42 to scan the cabin 24 and exterior areas 40 for detecting motion and gestures made by the passenger in the plurality of hotspot zones 44. For example, the microcontroller 82 can execute instructions to perform signal processing calculations on the received reflection and transmitted radiation signals (i.e., mixed signals) to implement the various detection techniques (e.g., CW Radar, FMCW Radar, time of flight, Doppler) to detect motion made by an occupant in the cabin of the vehicle. The microcontroller may then determine whether the detected motion matches a select gesture from a set of gestures. That is, the microcontroller 82 may compare the detected motion against stored data representing any number of gestures (i.e., a database of gesture data). When the microcontroller 82 successfully matches the detected motion with data representing a gesture, the microcontroller 82 may then determine that the occupant of the vehicle made the matched gesture. The database may be stored in non-volatile memory accessible by the microcontroller 82 and may include any number of gestures. The microcontroller 82 may use a threshold to determine if the detected motion matches a stored gesture. That is, in some examples, the detected motion must satisfy the threshold criteria (i.e., similarity to the stored gesture) before the microcontroller successfully matches the detected motion to the stored gesture. Thus, the radar assembly 28 can detect different gestures (i.e., hand movements) to operate different controls of the vehicle 20. Pre-established gesture zones can be mapped so hand gestures are only recognized when the hand 21 enters these regions and/or the system 34 can track the hands 21 within the cabin 24 (FIG. 4). Also, since radar can penetrate non-metallic materials, it can recognize gestures at the exterior 22 of the vehicle 20, for example adjacent to an exterior 22 surface of the passenger window, or even at the rear of the vehicle 20 (FIG. 3).

The at least one radar transmit antenna 36 can be configured to emit and detect continuous wave (CW) radar with the radar assembly and system with multifunction sensing functionality illustratively including one radar transmit antenna 36 and one radar receive antenna 42. With such a configuration, the radar assembly and system with multifunction sensing functionality is operable to detect a speed/velocity of the object/user 21 using the Doppler Radar principles (i.e., processing by a signal processor such as the microcontroller 82 of the received reflected CW radar signal to determine frequency shifts of an emitted continuous wave indicative of the speed of the object or user or hand 21). The at least one radar transmit antenna 36 can be also configured to emit frequency modulated continuous wave (FMCW) radar, with the radar assembly and system with multifunction sensing functionality illustratively including one radar transmit antenna 36 and one radar receive antenna 42 in accordance with another embodiment. With such a configuration, the radar assembly and system with multifunction sensing functionality is operable to detect a gesture/motion of the object/user 21 using the Frequency Modulated Radar techniques (i.e., processing by a signal processor such as the microcontroller 82 of the reflected FMCW radar signal to determine frequency shifts indicative of the speed (Doppler frequency) and distance (beat frequency) of the object or user or hand 21). Alternatively, the radar assembly and system with multifunction sensing functionality configured for FMCW radar can be configured to include at least one radar receive antenna 42 forming an antenna array for determining angle information of the reflected radar waves 38. Also, multiple radar transmit antenna 36 may be provided.

Figure 6A:
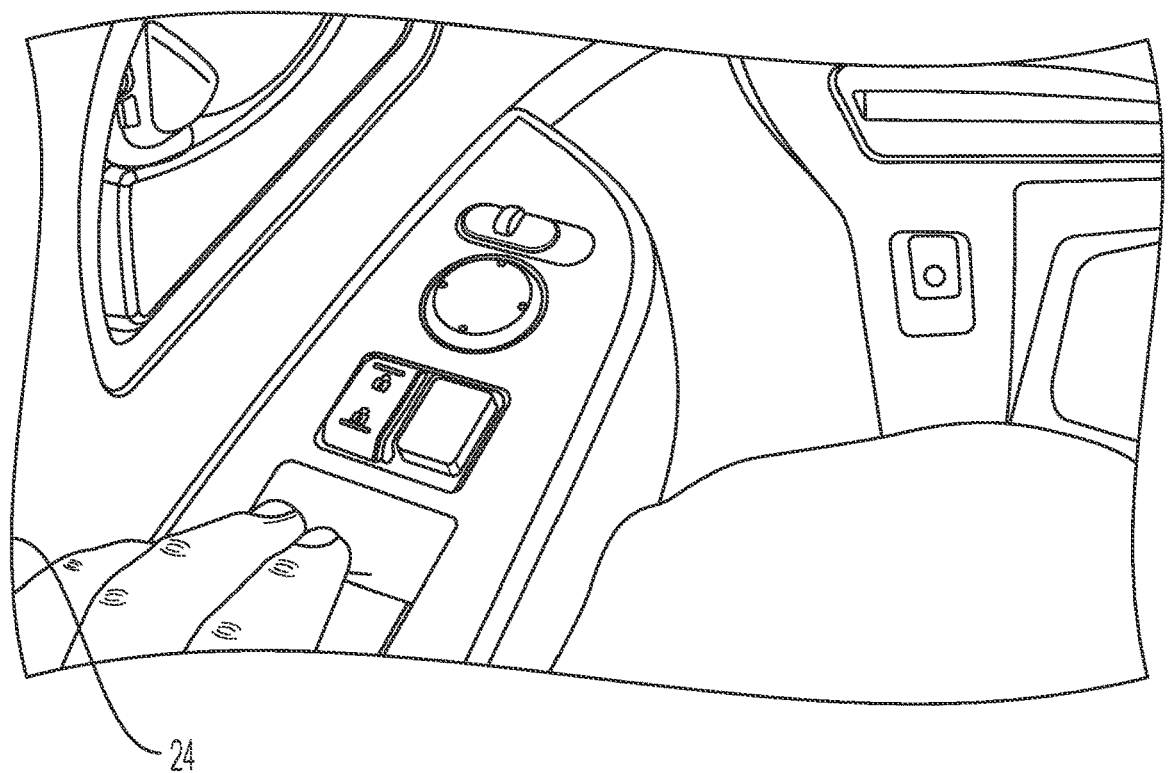
FIGS. 6A and 6B illustrate a partial enlarged view of a portion of the cabin of a conventional vehicle and the vehicle according to aspects of the disclosure, respectively.
Figure 6B:
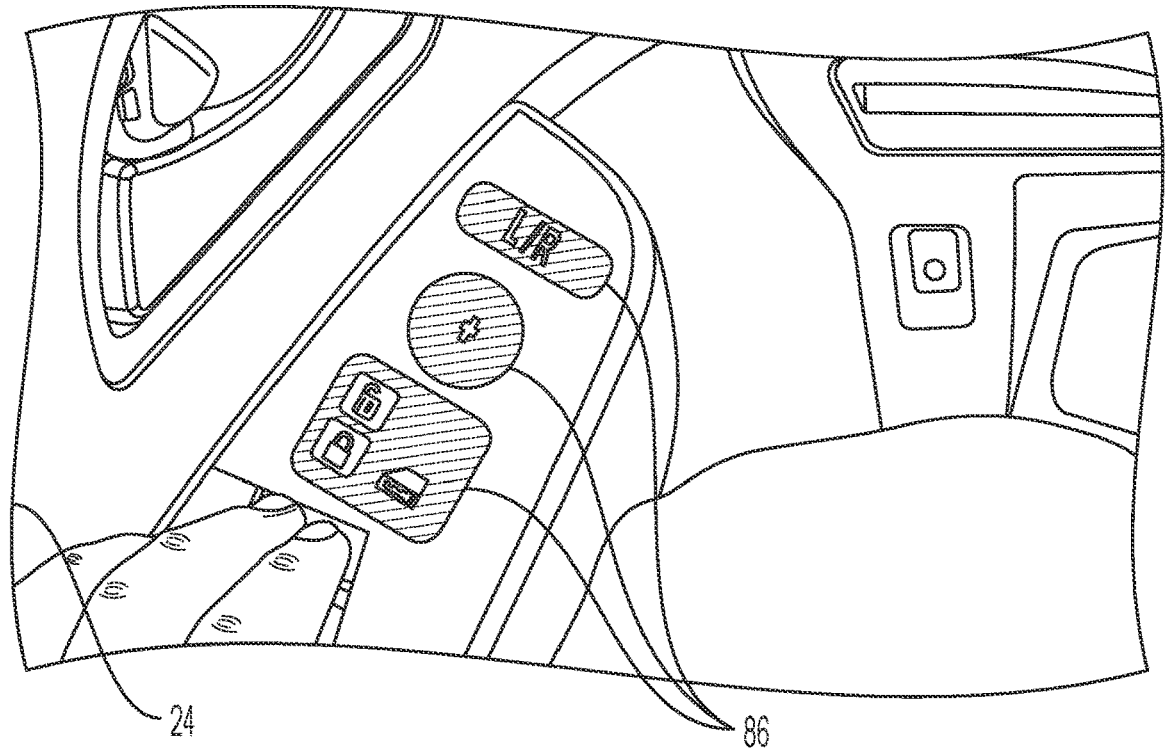
Figure 7A:
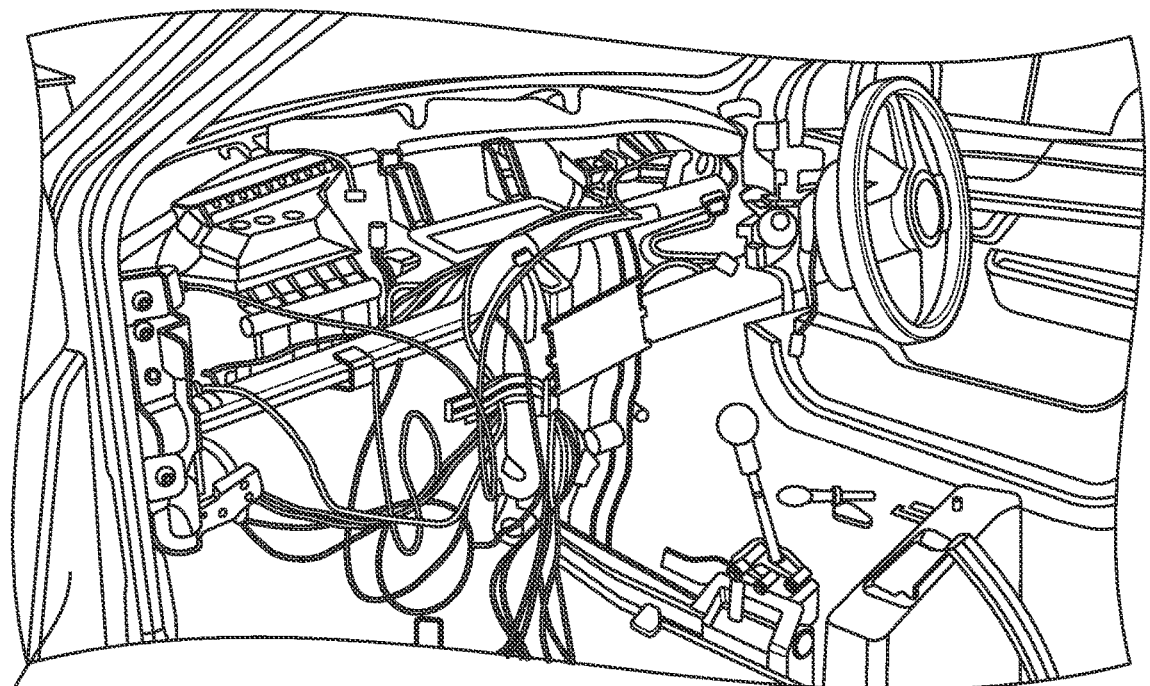
FIGS. 7A and 7B illustrate a partial view of the cabin of a conventional vehicle and the vehicle according to aspects of the disclosure, respectively.
Figure 7B:
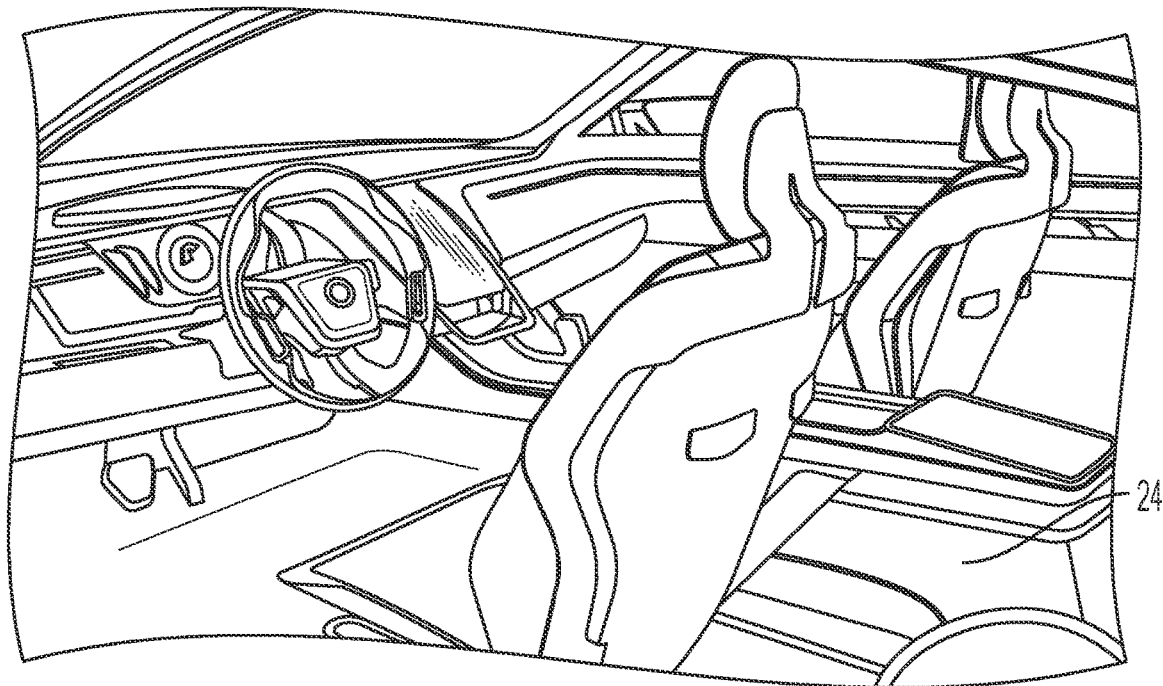

The system 34 can also include a plurality of markers 86 (FIGS. 4, 5, and 6B) representing button controls that are disposed in at least one of the cabin 24 of the vehicle 20 and the exterior areas 40. The plurality of markers 86 may, for example, be constructed with radar absorption properties having certain radar scattering or reflectivity properties as compared to the material adjacent to the marker, such as a plastic arm rest 23 or headrest 25 or console 27, or a metal sheet panel forming part of a vehicle door, to make the detection of the motion and gestures made by the passenger adjacent the plurality of markers 86 more apparent to the microcontroller 82 (i.e., to help ensure 21 that the reflectivity of the background does not overpower the reflectivity of the hand 21 thereby rendering the hand 21 undetectable). So, the microcontroller 82 of the radar assembly 28 can be programmed to recognize certain zones that represent button controls. For example, the lock/unlock buttons and power window controls normally located on a door arm rest panel 23 (FIG. 6A) can be replaced with a sticker, or other marker 86 (FIG. 6B) which is recognized by the system 34 as being one of the plurality of hotspot zones 44 correlated with a vehicle 20 function. A touch of the marker 86, or hover above the zone by a user or passenger can be recognized by the system 34 as representing a button push, such as a window open command. When the radar assembly and system is configured to detect distance (e.g., when configured using FMCW radar detection techniques) to and within the hotspot zones 44 (e.g., distances and angles representing the limits of the hotspot zones 44, such as d1, d2, d3, d4, d5, d6 and Θ (theta) illustratively shown in FIG. 3 and FIG. 4) from the radar assembly 28, a baseline distance can be pre-established by the microcontroller 82 and stored in memory 58 (e.g., a distance without a hand 21 present in the hotspot zone 44). For example, a natural vehicle background can be used to establish a baseline reference distance, such as the armrest 23, a head rest 25, a center console 27, or other interior vehicle surfaces. When a hand 21 or finger is moved into the hotspot zone 44, the microcontroller 82 can register a change in the distance measurement compared to the baseline reference distance indicative of an intent to by the user to initiate a command represented by the hotspot zone 44. For example, a detected distance change of 10 mm closer than the baseline reference distance can indicate that a finger has been placed on the marker 86 representing a button push. If a hand 21 is moved over the hotspot zone 44 but not within it, for example a hand 21 is moved at 300 mm above the marker 86, the microcontroller 82 can register a change in the distance measurement compared to the baseline reference distance, but since it is above a threshold distance defining the hotspot zone 44, the microcontroller 82 will not register the motion as indicative of an intent to by the user to initiate a command represented by the hotspot zone 44, thereby avoiding false detections. The radar assembly and system can also be configured to employ motion only based detection (i.e., detection a motion into the hotspot zone 44 and a motion out of the hotspot zone 44 for example) using Radar Doppler techniques, and measure the time between such motions to determine the intent to activate a command represented by the hotspot zone 44. In another embodiment, both motion and distance can be utilized to determine activation intents within predefined hotspot zones 44. As a result, the physical button (FIG. 6A), and wiring thereto (FIG. 7A) can be eliminated and the cabin 24 complexity and aesthetics (FIG. 7B) can advantageously be enhanced. Virtual buttons (i.e., the plurality of markers 86) can also be positioned at the exterior 22 of the vehicle 20, for example on the top of the side door 32 panel for access control, of even on the back of the trunk to signal a trunk open command.

Consequently, the microcontroller 82 is further configured to identify the plurality of hotspot zones 44 (e.g., areas around each of the plurality of markers 86) and identify the plurality of markers 86. Since the radar assembly 28 can be configured to detect radar signals containing information about distance, angle and/or velocity of the hand 21, multiple hotspot zones 44 (e.g., volumes) at different locations can be pre-established, as illustrated in FIG. 4, where each hotspot zone 44 can be correlated to a different vehicle function. The microcontroller 82 is also configured to identify the motion and gestures made by the passenger adjacent the plurality of markers 86 and correlate the motion and gestures made by the passenger to a plurality of marker operations associated with the plurality of markers 86. For example, the system can determine that the motion or gesture is at a particular marker and can correlate that determined motion or gesture with the marker operation associated with that marker. That is, each gesture performed at a particular marker may be associated with one or more corresponding marker operations (i.e., operations to accomplish an action or task associated with the gesture). The microcontroller 82 can be configured to communicate one or more of a plurality of marker control commands corresponding to the respective or particular one of the plurality of marker operations to one or more of the plurality of vehicle controllers in response to correlating the motion and gestures made by the passenger to the particular or respective marker operation of the plurality of marker operations. The plurality of marker operations can include locking and unlocking and opening a window of the vehicle 20 and closing the window of the vehicle 20 and starting an engine of the vehicle 20 and opening a gas tank of the vehicle 20. However, it should be understood that the plurality of marker operations can include various other functions of the vehicle 20.

Figure 8:
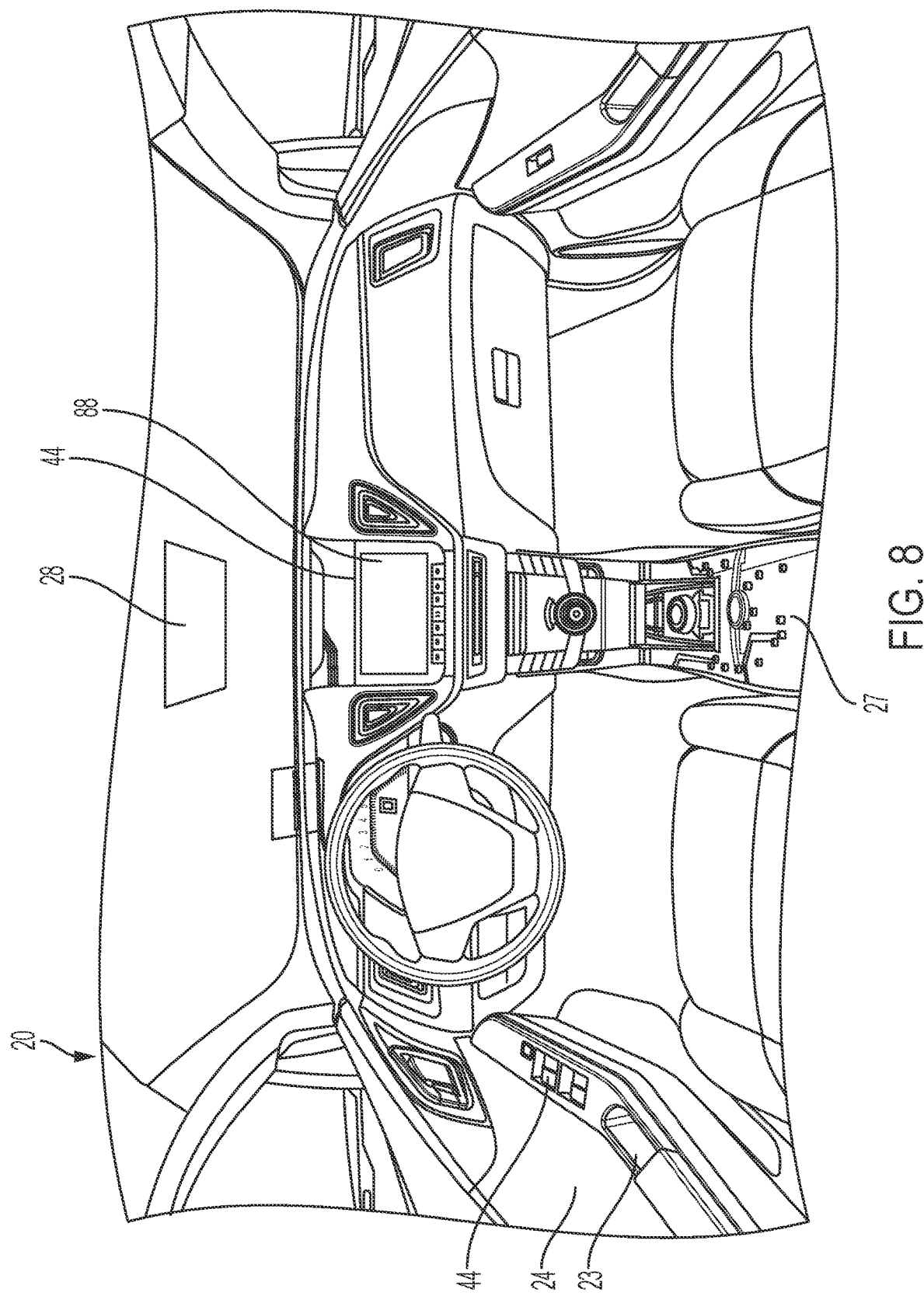
FIG. 8 illustrates the cabin of the vehicle including a touchscreen according to aspects of the disclosure.

As best shown in FIG. 8, the cabin 24 may also include at least one touchscreen 88 that defines a plurality of regions (i.e., areas of the touchscreen 88). Thus, the area of around the touchscreen 88 can be one of the plurality of hotspot zones 44 and the microcontroller 82 can further be configured to identify the motion and gestures made by the passenger adjacent to the at least one touchscreen 88. The microcontroller 82 can correlate the motion and gestures made by the passenger to a plurality of touchscreen operations associated with the plurality of regions of the touchscreen 88. The microcontroller 82 can then communicate a plurality of touchscreen control commands corresponding to the plurality of touchscreen operations to the plurality of vehicle controllers in response to correlating the motion and gestures made by the passenger to the plurality of touchscreen operations. Much like the marker operations, the plurality of touchscreen operations can include increasing volume and changing a channel (e.g., a radio station of a head unit), for example; however, others are contemplated. As a result, the touchscreen 88 can even be replaced with a normal screen (i.e., a display without touch capability), since the system 34 can correlate objects on the screen (i.e., the plurality of regions of the touchscreen 88) and a one of the plurality of hotspot zones 44 can be located where a passenger or user's finger can touch or hover.

Figure 9:
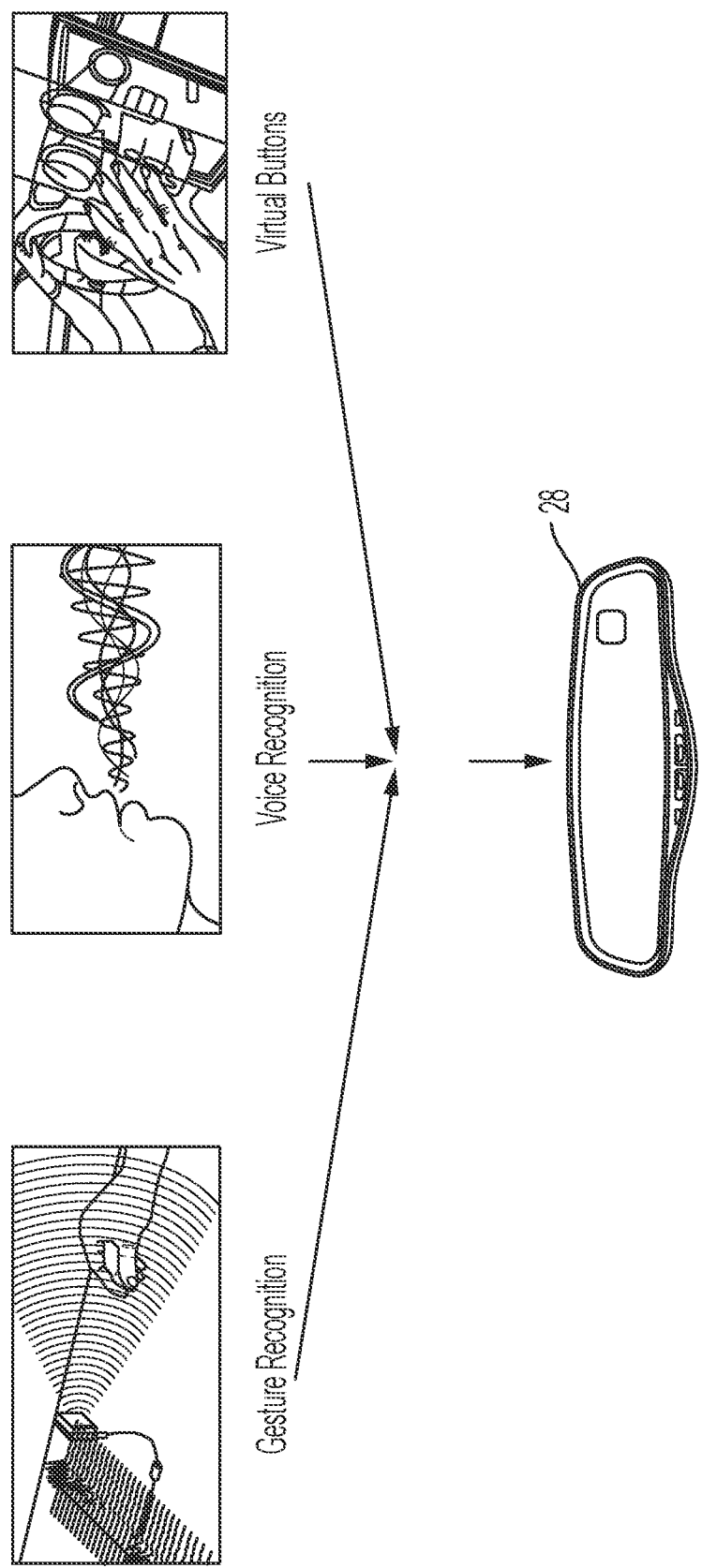
FIG. 9 illustrates that the radar assembly can replace numerous other conventional sensing technologies according to aspects of the disclosure.
Figure 10:
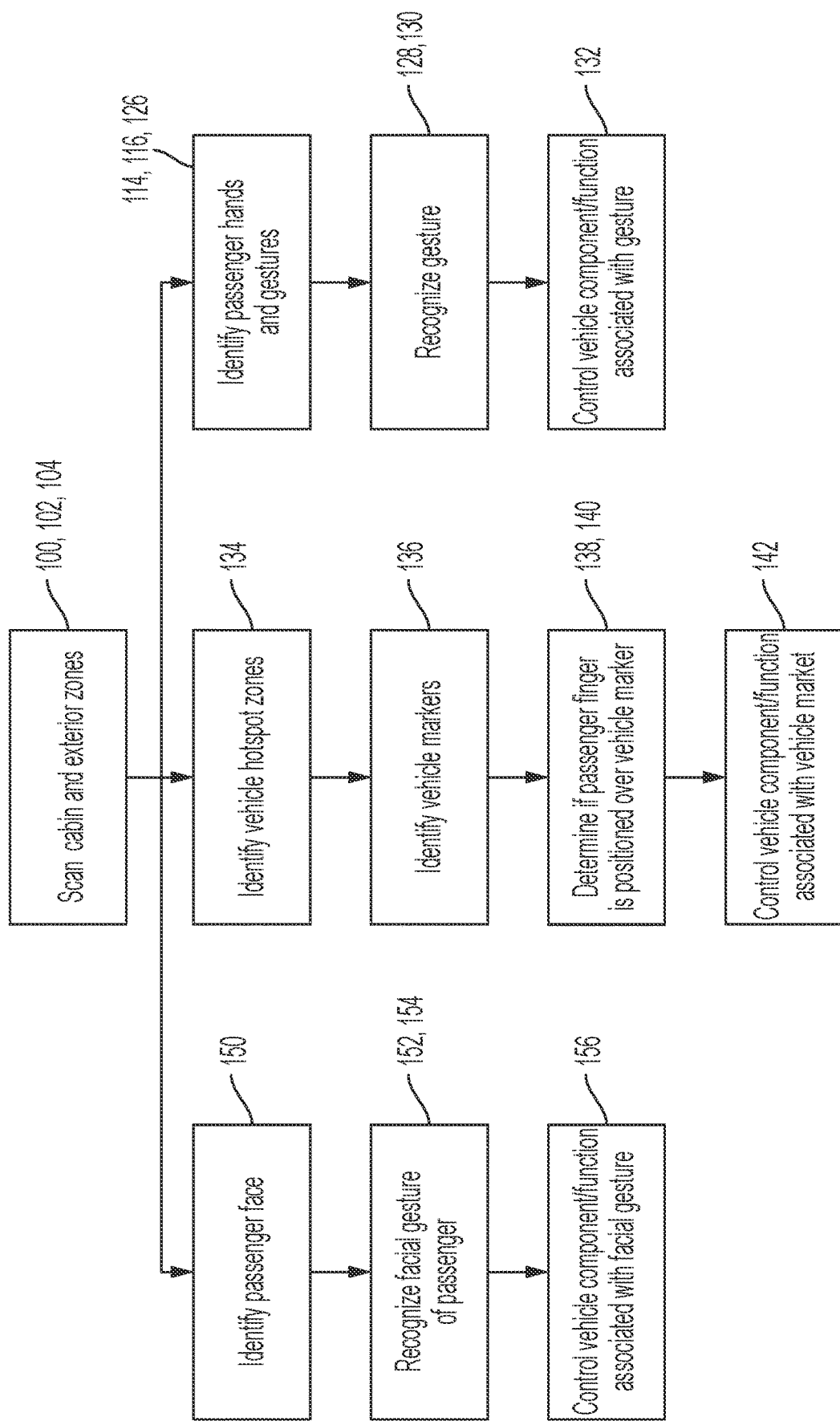
Figure 11:
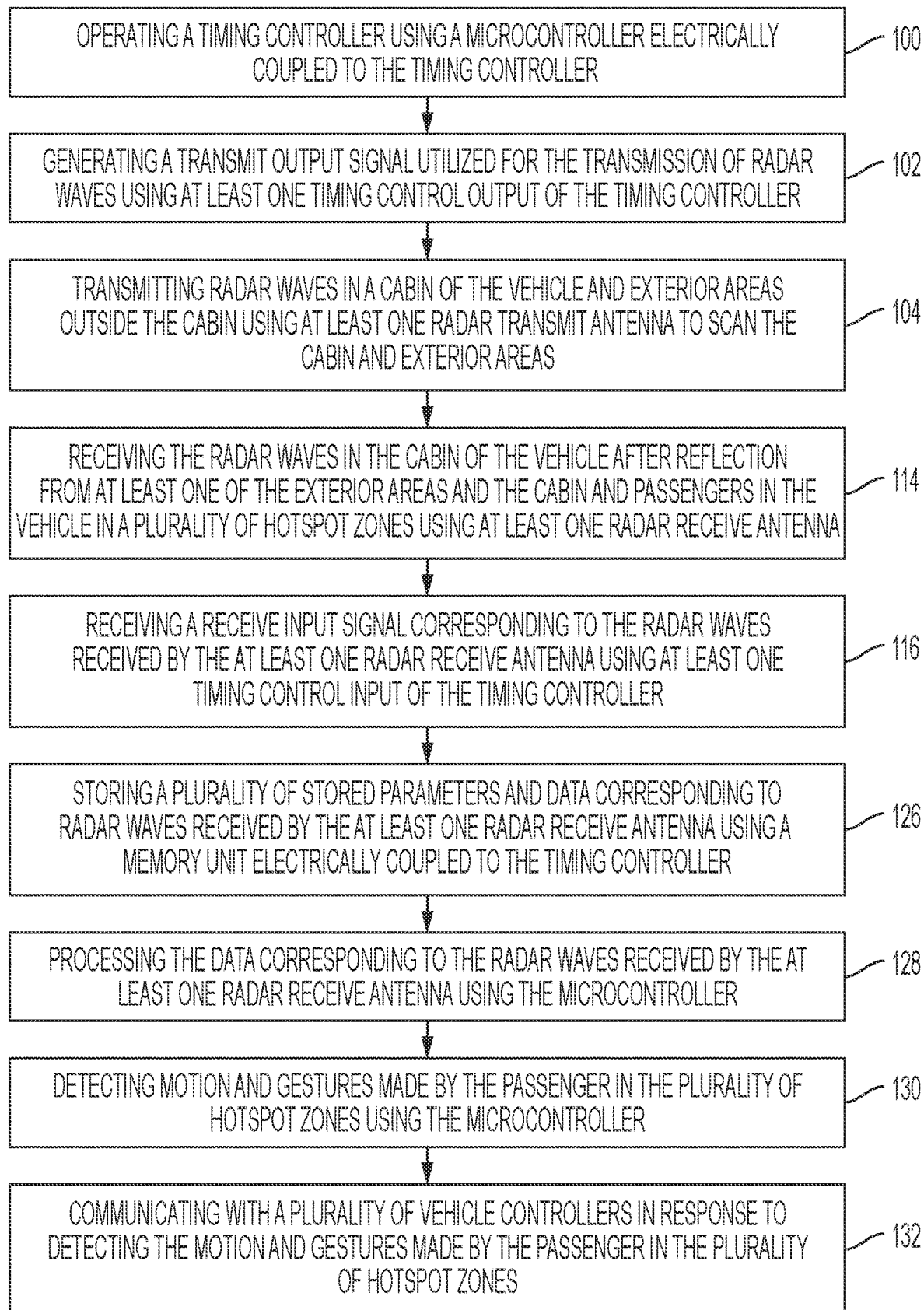
Figures 1, 12A:
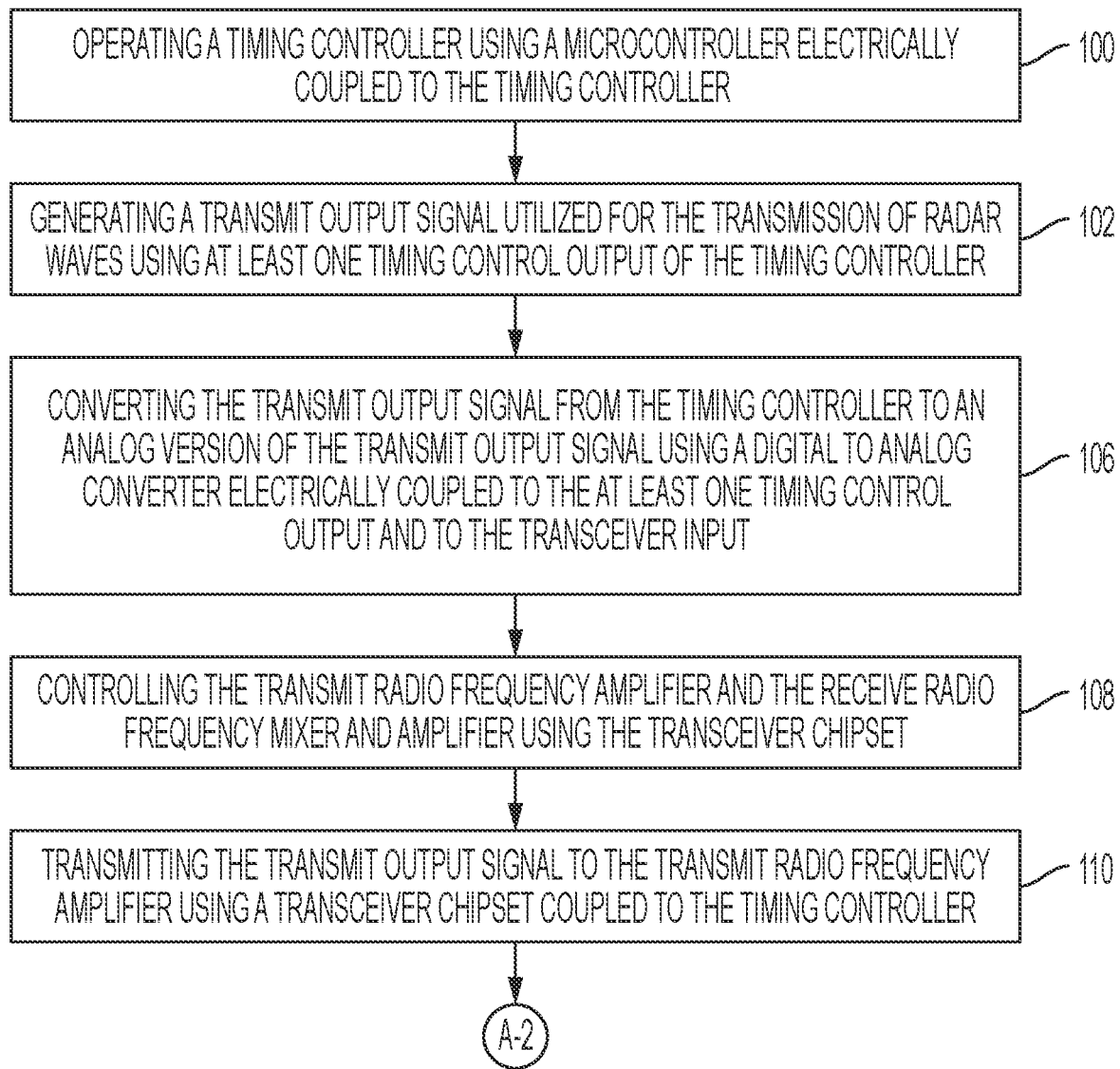
Figures 2, 12A:
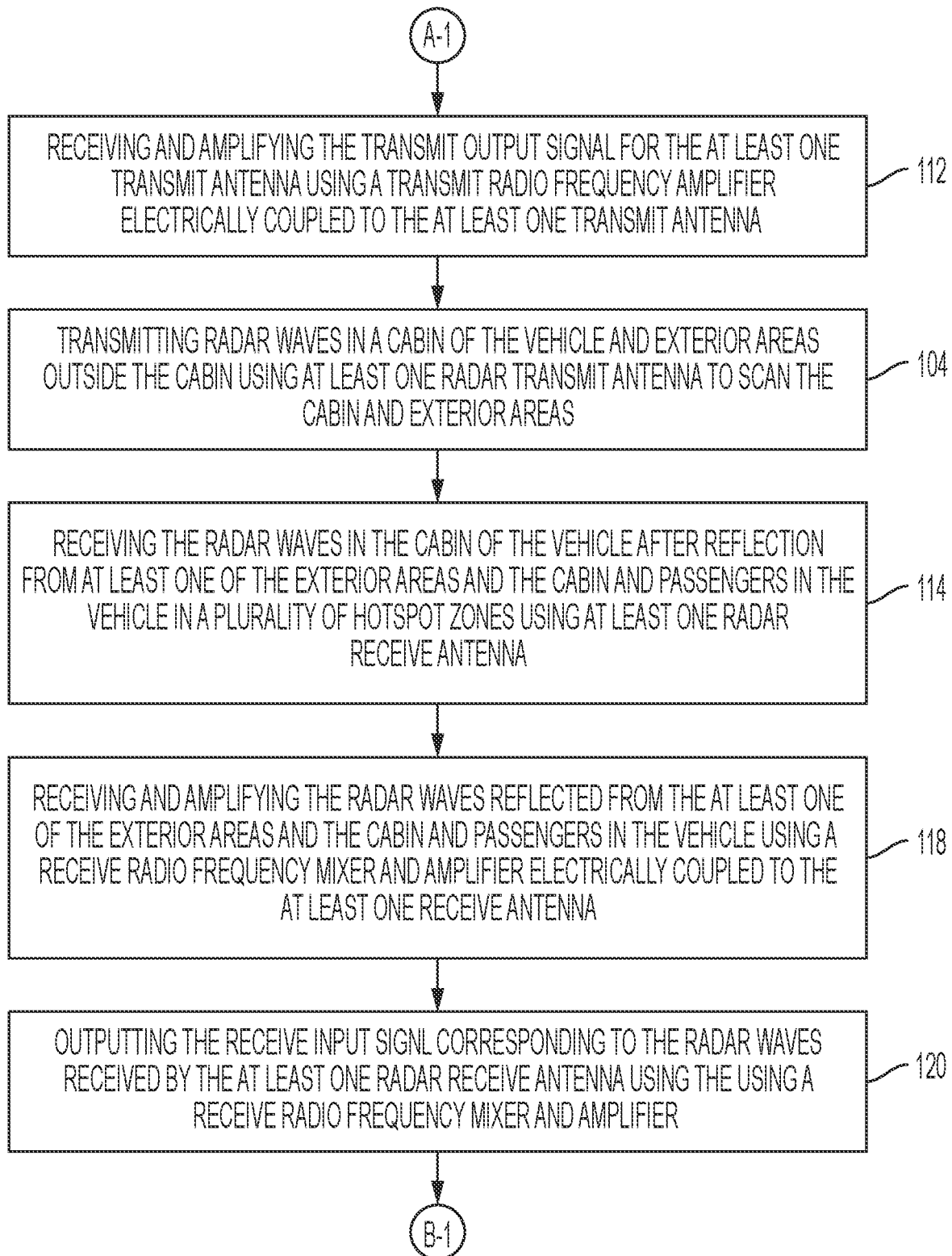
Figures 1, 12B:
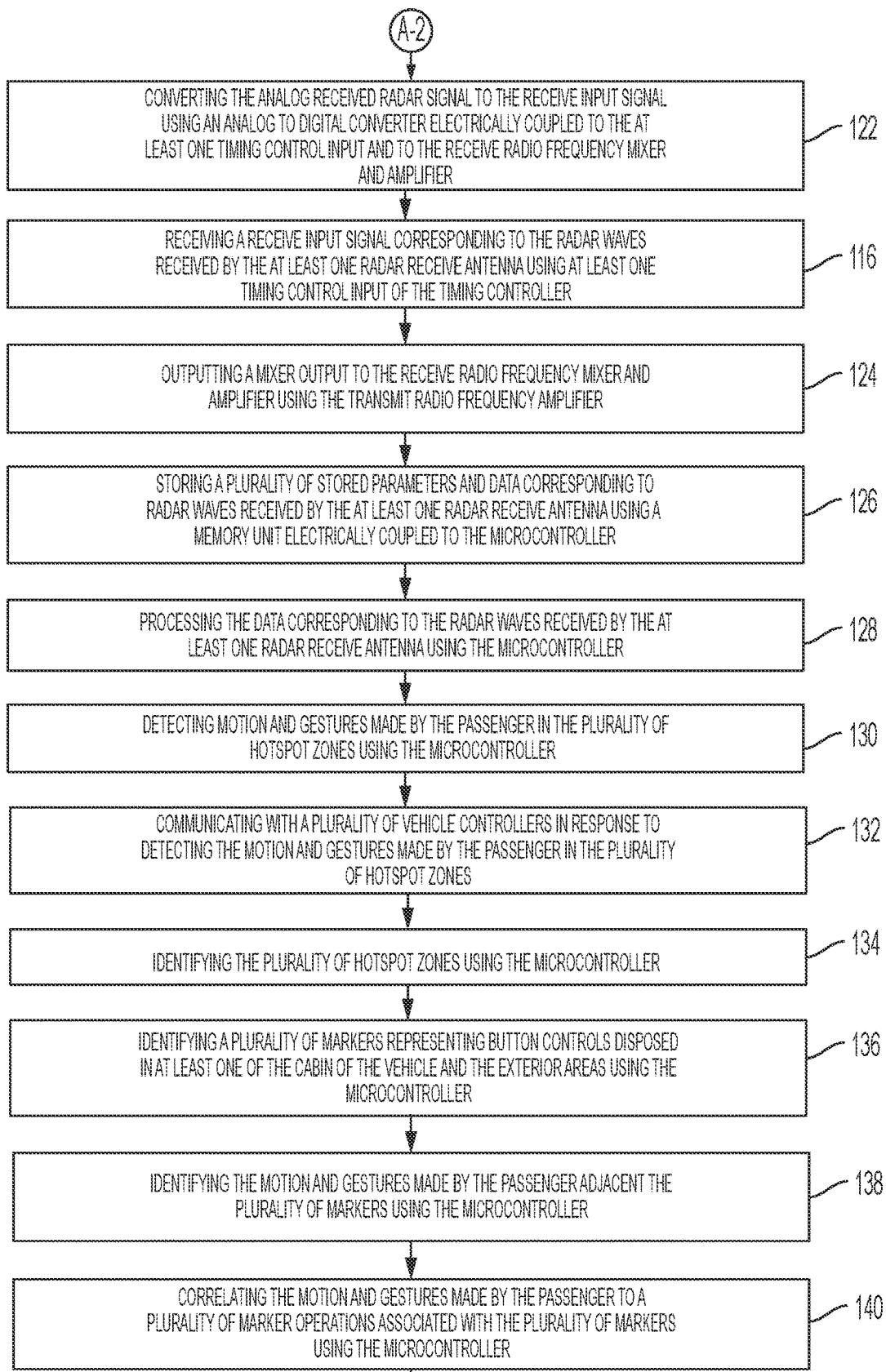
Figures 2, 12B:
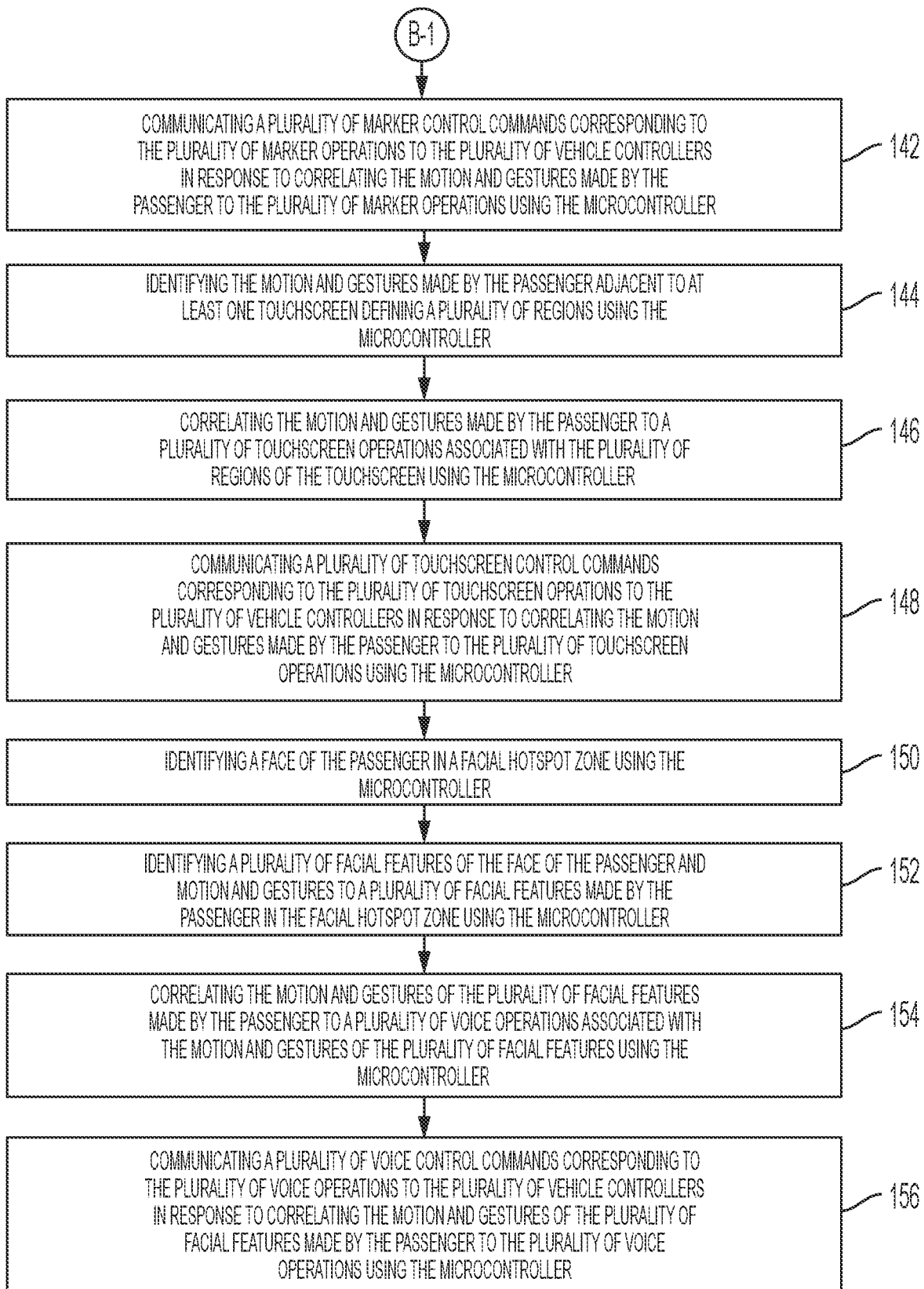

The plurality of hotspot zones 44 can include a facial hotspot zone 44 (i.e., near a face of the passenger). As a result, the microcontroller 82 can further be configured to identify the face of the passenger and identify a plurality of facial features of the face of the passenger and motion and gestures of the plurality of facial features made by the passenger in the facial hotspot zone 44. As with the plurality of marker and touchscreen operations, the microcontroller 82 can be configured to correlate the motion and gestures of the plurality of facial features made by the passenger to a plurality of voice operations associated with the motion and gestures of the plurality of facial features. The microcontroller 82 can also communicate a plurality of voice control commands corresponding to the plurality of voice operations to the plurality of vehicle controllers in response to correlating the motion and gestures of the plurality of facial features made by the passenger to the plurality of voice operations. Therefore, conventional systems 34 for voice recognition can be replaced with gesture recognition of facial features as a result of the higher resolution provided by the radar assembly 28 disclosed herein. As a result, voice commands can be recognized despite road noise, loud music, etc. by mouthing the commands. The plurality of voice operations may, for example, include locking and unlocking and opening a window of the vehicle 20 and closing the window of the vehicle 20 and starting an engine of the vehicle 20 and opening a gas tank of the vehicle 20 and increasing radio volume and changing a channel. Nevertheless, it should be understood that other operations are possible. Consequently, the radar assembly 28 can replace numerous other conventional sensing technologies as shown in FIG. 9.

Thus, the system can detect a motion of an occupant in the vehicle at or near a target zone where a gesture is likely to occur. The system determines whether or not the detected motion corresponds to a particular gesture, such as via comparing the detected motion to stored gestures that are associated with the target zone (with each stored gesture associated with a particular control operation for controlling a respective accessory or feature or function). Responsive to determining that the detected motion corresponds to a particular gesture, with that particular gesture correlated with or associated with a particular operation or function, the system generates an output associated with the determined particular gesture, such as a control output to control an accessory of the vehicle in accordance with the particular gesture and associated operation or function.

As best shown in FIGS. 10, 11, and 12A-1 to 12B-2, a method of sensing user interactions using the radar assembly 28 with multifunction sensing functionality in the vehicle 20 is also provided. The method includes the step of 100 operating a timing controller 46 using a microcontroller 82 electrically coupled to the timing controller 46. The next step of the method is 102 generating a transmit output signal 52 utilized for the transmission of radar waves 38 using at least one timing control output 50 of the timing controller 46.

Next, the method includes the step of 104 transmitting radar waves 38 in a cabin 24 of the vehicle 20 and exterior areas 40 outside the cabin 24 using at least one radar transmit antenna 36 to scan the cabin 24 and exterior areas 40. Specifically, the method can include the step of 106 converting the transmit output signal 52 from the timing controller 46 to an analog version of the transmit output signal 52 using a digital to analog converter 78 electrically coupled to the at least one timing control output 50 and to the transceiver input 74. Next, 108 controlling the transmit radio frequency amplifier 60 and the receive radio frequency mixer and amplifier 64 using the transceiver chipset 72. The method can also include 110 transmitting the transmit output signal 52 to the transmit radio frequency amplifier 60 using a transceiver chipset 72 coupled to the timing controller 46. The method can then include the step of 112 receiving and amplifying the transmit output signal 52 for the at least one radar transmit antenna 36 using a transmit radio frequency amplifier 60 electrically coupled to the at least one radar transmit antenna 36.

The method proceeds with the step of 114 receiving the radar waves 38 in the cabin 24 of the vehicle 20 after reflection from at least one of the exterior areas 40 and from in the cabin 24 and from passengers in the vehicle 20 at a plurality of hotspot zones 44 using at least one radar receive antenna 42. The method continues by 116 receiving a receive input signal 56 corresponding to the radar waves 38 received by the at least one radar receive antenna 42 using at least one timing control input 54 of the timing controller 46. In more detail, the method can also include the step of 118 receiving and amplifying the radar waves 38 reflected from the at least one of the exterior areas 40 and the cabin 24 and passengers in the vehicle 20 using a receive radio frequency mixer and amplifier 64 electrically coupled to the at least one radar receive antenna 42. The method can also continue by 120 outputting the receive input signal 56 corresponding to the radar waves 38 received by the at least one radar receive antenna 42 using the using a receive radio frequency mixer and amplifier 64. The method additionally can continue with the step of 122 converting the analog received radar signal 76 to the receive input signal 56 using an analog to digital converter 80 electrically coupled to the at least one timing control input 54 and to the receive radio frequency mixer and amplifier 64. The method can further include the step of 124 outputting a mixer output 68 to the receive radio frequency mixer and amplifier 64 using the transmit radio frequency amplifier 60. The method proceeds with the step of 126 storing a plurality of stored parameters and data corresponding to radar waves 38 received by the at least one radar receive antenna 42 using a memory unit 58 electrically coupled to the timing controller 46. The step of 126 storing a plurality of stored parameters and data corresponding to radar waves 38 received by the at least one radar receive antenna 42 using a memory unit 58 can include storing at least one of a distance and angle from the at least one radar receive antenna 42 to a hotspot zone 44. The step of 126 storing a plurality of stored parameters and data corresponding to radar waves 38 received by the at least one radar receive antenna 42 using a memory unit 58 can further include storing at least one of a distance and angle from the at least one radar receive antenna 42 to an interior vehicle surface representing a distal limit of a hotspot zone 44. The step of 126 storing a plurality of stored parameters and data corresponding to radar waves 38 received by the at least one radar receive antenna 42 using a memory unit 58 can further include storing a distance from the at least one radar receive antenna 42 to a baseline reference distance representing a distal limit of a hotspot zone 44. The step of 126 storing a plurality of stored parameters and data corresponding to radar waves 38 received by the at least one radar receive antenna 42 using a memory unit 58 can include storing a baseline radar signature of the interior of the vehicle cabin 24 without any passengers or objects to establish a baseline radar reference map.

The method continues with the step of 128 processing the data corresponding to the radar waves 38 received by the at least one radar receive antenna 42 using the microcontroller 82. The step of 128 processing the data corresponding to the radar waves 38 received by the at least one radar receive antenna 42 using the microcontroller 82 can include detecting a change in distance between the baseline reference distance and an object, such as a hand 21 or finger, in the hotspot zone 44. The step of 128 processing the data corresponding to the radar waves 38 received by the at least one radar receive antenna 42 using the microcontroller 82 can include detecting a change in the baseline radar signature of the cabin 24, and more particularly detecting a change in the baseline radar signature of the hotspot zone 44. Next, 130 detecting motion and gestures made by the passenger in the plurality of hotspot zones 44 using the microcontroller 82. The method then includes the step of 132 communicating with a plurality of vehicle controllers in response to detecting the motion and gestures made by the passenger in the plurality of hotspot zones 44.

As indicated above, the system 34 can include the plurality of markers 86. So, the method can include 134 identifying the plurality of hotspot zones 44 using the microcontroller 82. Next, 136 identifying a plurality of markers 86 representing button controls or user inputs or user actuatable input devices disposed in at least one of the cabin 24 of the vehicle 20 and the exterior areas 40 using the microcontroller 82. The method can continue with the step of 138 identifying the motion and gestures made by the passenger adjacent the plurality of markers 86 using the microcontroller 82. The method can also include the step of 140 correlating the motion and gestures made by the passenger to a plurality of marker operations associated with the plurality of markers 86 using the microcontroller 82. The method can continue by 142 communicating a plurality of marker control commands corresponding to the plurality of marker operations to the plurality of vehicle controllers in response to correlating the motion and gestures made by the passenger to the plurality of marker operations using the microcontroller 82.

Since the system 34 can include at least one touchscreen 88, the method can include the steps of 144 identifying the motion and gestures made by the passenger adjacent to at least one touchscreen 88 defining a plurality of regions using the microcontroller 82 and 146 correlating the motion and gestures made by the passenger to a plurality of touchscreen operations associated with the plurality of regions of the touchscreen 88 using the microcontroller 82. The method can then include the step of 148 communicating a plurality of touchscreen control commands corresponding to the plurality of touchscreen operations to the plurality of vehicle controllers in response to correlating the motion and gestures made by the passenger to the plurality of touchscreen operations using the microcontroller 82.

Furthermore, the method may include the step of 150 identifying a face of the passenger in a facial hotspot zone 44 using the microcontroller 82. Next, 152 identifying a plurality of facial features of the face of the passenger and motion and gestures of the plurality of facial features made by the passenger in the facial hotspot zone 44 using the microcontroller 82. The method then proceeds with the step of 154 correlating the motion and gestures of the plurality of facial features made by the passenger to a plurality of voice operations associated with the motion and gestures of the plurality of facial features using the microcontroller 82. Then, the method can include the step of 156 communicating a plurality of voice control commands corresponding to the plurality of voice operations to the plurality of vehicle controllers in response to correlating the motion and gestures of the plurality of facial features made by the passenger to the plurality of voice operations using the microcontroller 82.

Referring now to FIG. 13, in some examples, a screen located below the interior rearview mirror assembly 28 (e.g., touchscreen 88) is tagged or marked in a similar manner as the other markers for calibration with the radar system in the mirror 28 to compensate for when the driver adjusts the mirror's orientation. That is, the tags or marks located on or within the screen 88 allow the controller to determine the current orientation of the rearview mirror 28. In response to determining the orientation of the rearview mirror 28, the controller may adjust processing of both the transmitted and received radar signals (to compensate for or to accommodate a change in the orientation of the rearview mirror 28). The controller may also or otherwise accommodate a change in the orientation of the rearview mirror by adjusting the position of hotspot zones 44 and/or by adjusting the display of the screen (so that the displayed inputs are at different locations at the screen depending on the adjustment and orientation of the mirror). The system may include a controller that detects gesture in the area in front of the screen and updates the screen's display accordingly (based on the orientation of the rearview mirror 28). Properly calibrating the radar unit and mirror position relative to the screen (or calibrating the screen relative to the radar unit and mirror position) ensures that the user's actions correspond to a display on the screen. For example, an image of a rotatable knob may be virtually rotated by a user making a rotating gesture in front of the displayed knob. The system and controller can detect and identify such gestures irrespective of a mirror adjustment that may be made by a driver of the vehicle to obtain the desired rearward field of view at the mirror reflective element.

Figure 15:
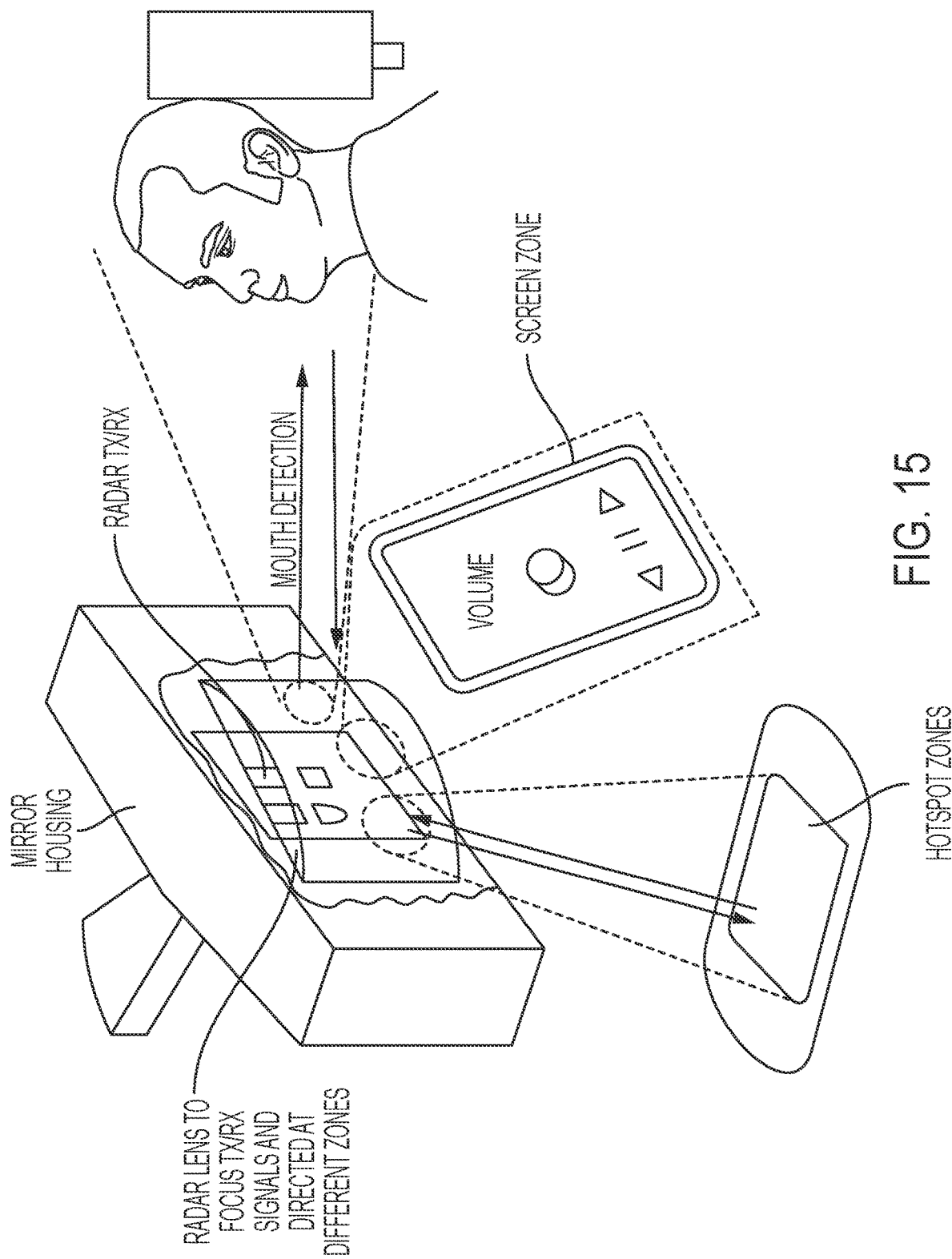
FIG. 15 illustrates an interior rearview mirror that directs radar at different zones according to aspects of the disclosure.

Referring now to FIGS. 14A-14C, different radar lenses, for example lenses made of plastic, may be tuned for known detection zones. The lens may be curved (FIG. 14A) or stepped (FIG. 14B) in the vertical and horizontal directions depending on where the detection zone is so the field of view is increased. In some examples, no lens is provided (FIG. 14C) and instead radar beam steering is used to focus the radar waves toward or at a known detection zone. FIG. 15 depicts the rearview mirror 28 using radar lenses (such as lenses of the types shown, for example, in FIGS. 14A-14C) to focus TX and/or RX signals directed at different zones. For example, the radar signals may be directed at hotspot zones or at the touchscreen 88. The radar signals may detect the mouth of a passenger. The rearview mirror 28 may detect motion adjacent a screen (e.g., the touchscreen 88) and change the screen in response to the sensed motion.

Clearly, changes may be made to what is described and illustrated herein without departing from the scope defined in the accompanying claims. The system and radar assembly may be operable for any kind of vehicle operation or user input within the motor vehicle, for example and advantageously improves upon conventional sensing solutions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example user-activated, non-contact power closure member system can likewise be implemented into many other systems to control one or more operations and/or functions.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

The invention claimed is:

1. A vehicular cabin monitoring system, the vehicular cabin monitoring system comprising:
   a radar assembly disposed in a cabin of a vehicle equipped with the vehicular cabin monitoring system, the radar assembly operable to capture radar data;
   wherein the radar assembly comprises at least one radar transmit antenna that is operable to transmit radar waves;
   wherein the radar assembly comprises at least one radar receive antenna that is operable to receive radar waves;
   a control comprising a data processor for processing radar data captured by the radar assembly;
   wherein the control, via processing at the data processor of radar data captured by the radar assembly, detects movement of a body part of an occupant present in the cabin of the vehicle;
   wherein the control, responsive to detecting movement of the body part of the occupant present in the cabin of the vehicle, generates a control command associated with at least one operation of the vehicle; and
   wherein the radar assembly is housed in an interior rearview mirror assembly of the vehicle.

2. The vehicular cabin monitoring system of claim 1, wherein the radar assembly is housed in a mirror head of the interior rearview mirror assembly of the vehicle.

3. The vehicular cabin monitoring system of claim 2, wherein the radar assembly is disposed behind a mirror reflective element of the mirror head of the interior rearview mirror assembly of the vehicle.

4. The vehicular cabin monitoring system of claim 1, wherein the control, responsive to processing at the data processor of radar data captured by the radar assembly, determines an orientation of the interior rearview mirror assembly relative to an interior portion of the cabin of the vehicle.

5. The vehicular cabin monitoring system of claim 4, wherein the control calibrates the vehicular cabin monitoring system to accommodate the determined orientation of the interior rearview mirror assembly relative to the interior portion of the cabin of the vehicle.

6. The vehicular cabin monitoring system of claim 4, wherein the vehicular cabin monitoring system determines a location of a marker relative to the interior rearview mirror assembly, and wherein the control determines the orientation of the interior rearview mirror assembly based on the determined location of the marker relative to the interior rearview mirror assembly.

7. The vehicular cabin monitoring system of claim 6, wherein the control calibrates the vehicular cabin monitoring system to accommodate the determined orientation of the interior rearview mirror assembly relative to the marker.

8. The vehicular cabin monitoring system of claim 7, wherein the marker is disposed at a touch screen in the cabin of the vehicle, and wherein the control calibrates the vehicular cabin monitoring system by adjusting a position of display of the marker at the touch screen to accommodate the determined orientation of the interior rearview mirror assembly relative to the marker.

9. The vehicular cabin monitoring system of claim 1, comprising a timing controller comprising at least one processing control input and at least one timing control output electrically coupled to the at least one radar transmit antenna for generating a transmit output signal utilized for transmission of the radar waves, and wherein the timing controller comprises at least one timing control input electrically coupled to the at least one radar receive antenna for receiving a receive input signal representative of the radar waves received by the at least one radar receive antenna.

10. A vehicular cabin monitoring system, the vehicular cabin monitoring system comprising:
a radar assembly disposed in a cabin of a vehicle equipped with the vehicular cabin monitoring system, the radar assembly operable to capture radar data;
wherein the radar assembly comprises at least one radar transmit antenna that is operable to transmit radar waves;
wherein the radar assembly comprises at least one radar receive antenna that is operable to receive radar waves;
a control comprising a data processor for processing radar data captured by the radar assembly;
a transmit radio frequency amplifier electrically coupled to the at least one radar transmit antenna;
a receive radio frequency mixer and amplifier electrically coupled to the at least one radar receive antenna;
wherein the transmit radio frequency amplifier receives and amplifies a transmit output signal for the at least one radar transmit antenna;
wherein the receive radio frequency mixer and amplifier receives and amplifies the radar waves reflected off an occupant present in the cabin of the vehicle;
wherein the receive radio frequency mixer and amplifier outputs a receive input signal representative of the radar waves received by the at least one radar receive antenna;
wherein the control, via processing at the data processor of radar data captured by the radar assembly, detects movement of a body part of the occupant present in the cabin of the vehicle; and
wherein the control, responsive to detecting movement of the body part of the occupant present in the cabin of the vehicle, generates a control command associated with at least one operation of the vehicle.

11. The vehicular cabin monitoring system of claim 10, wherein the control is electrically coupled to a vehicle communication bus of the vehicle.

12. A vehicular cabin monitoring system, the vehicular cabin monitoring system comprising:
a radar assembly disposed in a cabin of a vehicle equipped with the vehicular cabin monitoring system, the radar assembly operable to capture radar data;
wherein the radar assembly comprises at least one radar transmit antenna that is operable to transmit radar waves;
wherein the radar assembly comprises at least one radar receive antenna that is operable to receive radar waves;
a control comprising a data processor for processing radar data captured by the radar assembly;
wherein the control, via processing at the data processor of radar data captured by the radar assembly, detects movement of a body part of an occupant present in the cabin of the vehicle;
wherein the control, responsive to detecting movement of the body part of the occupant present in the cabin of the vehicle, generates a control command associated with at least one operation of the vehicle; and
wherein the control, responsive to processing at the data processor of radar data captured by said radar assembly, identifies at least one marker and identifies the movement of the body part of the occupant present in the cabin of the vehicle adjacent to the at least one marker, and wherein the control, responsive to identification of the at least one marker and the movement of the body part of the occupant, generates the control command.

13. The vehicular cabin monitoring system of claim 12, wherein the at least one operation of the vehicle comprises at least one selected from the group consisting of (i) locking, unlocking, opening or closing a window of the vehicle, (ii) starting an engine of the vehicle, and (iii) opening a gas tank of the vehicle.

14. The vehicular cabin monitoring system of claim 12, wherein the at least one marker comprises at least one element constructed with radar absorption properties having enhanced radar scattering or reflectivity properties as compared to material adjacent to the at least one marker.

15. A vehicular cabin monitoring system, the vehicular cabin monitoring system comprising:
a radar assembly disposed in a cabin of a vehicle equipped with the vehicular cabin monitoring system, the radar assembly operable to capture radar data;
wherein the radar assembly comprises at least one radar transmit antenna that is operable to transmit radar waves;
wherein the radar assembly comprises at least one radar receive antenna that is operable to receive radar waves;
a control comprising a data processor for processing radar data captured by the radar assembly;
wherein the control, via processing at the data processor of radar data captured by the radar assembly, detects movement of a body part of an occupant present in the cabin of the vehicle;
wherein the control, responsive to detecting movement of the body part of the occupant present in the cabin of the vehicle, generates a control command associated with at least one operation of the vehicle; and
wherein the control, responsive to processing at the data processor of radar data captured by said radar assembly, identifies the movement of the body part of the occupant present in the cabin of the vehicle adjacent to a touchscreen in the cabin of the vehicle and generates the control command.

16. The vehicular cabin monitoring system of claim 15, wherein the at least one operation of the vehicle comprises at least one selected from the group consisting of (i) increasing volume of a head unit of the vehicle and (ii) changing a channel of a head unit of the vehicle.

17. The vehicular cabin monitoring system of claim 10, wherein the control, responsive to processing at the data processor of radar data captured by said radar assembly, identifies movement of the head of the occupant, and wherein the control, responsive to identification of movement of the head of the occupant, generates the control command.

18. The vehicular cabin monitoring system of claim 1, wherein the control, responsive to processing at the data processor of radar data captured by said radar assembly, identifies movement of a hand of the occupant, and wherein the control, responsive to identification of movement of the hand of the occupant, generates the control command.

19. The vehicular cabin monitoring system of claim 10, wherein the control, responsive to processing at the data processor of radar data captured by said radar assembly, identifies a facial feature of the occupant and identifies movement of the facial feature made by the occupant, and wherein the control, responsive to identification of the facial feature of the occupant and identification of movement of the facial feature made by the occupant, generates the control command.

20. The vehicular cabin monitoring system of claim 19, wherein the at least one operation of the vehicle comprises at least one selected from the group consisting of (i) locking, unlocking, opening or closing a window of the vehicle, (ii) starting an engine of the vehicle, (iii) opening a gas tank of the vehicle, (iv) increasing volume of a head unit of the vehicle and (v) changing a channel of a head unit of the vehicle.

21. A vehicular cabin monitoring system, the vehicular cabin monitoring system comprising:
a radar assembly disposed in a cabin of a vehicle equipped with the vehicular cabin monitoring system, the radar assembly operable to capture radar data;
wherein the radar assembly comprises at least one radar transmit antenna that is operable to transmit radar waves;
wherein the radar assembly comprises at least one radar receive antenna that is operable to receive radar waves;
a control comprising a data processor for processing radar data captured by the radar assembly;
wherein the control, via processing at the data processor of radar data captured by the radar assembly, detects movement of a body part of an occupant present in the cabin of the vehicle;
wherein the control, responsive to detecting movement of the body part of the occupant present in the cabin of the vehicle, generates a control command associated with at least one operation of the vehicle; and
wherein the at least one radar transmit antenna comprises at least one focusing lens, and wherein the at least one focusing lens focuses the transmitted radar waves to a plurality of hotspot zones in the vehicle.

22. A vehicular cabin monitoring system, the vehicular cabin monitoring system comprising:
a radar assembly disposed in a cabin of a vehicle equipped with the vehicular cabin monitoring system, the radar assembly operable to capture radar data;
wherein the radar assembly comprises at least one radar transmit antenna that is operable to transmit radar waves;
wherein the radar assembly comprises at least one radar receive antenna that is operable to receive radar waves;
a control comprising a data processor for processing radar data captured by the radar assembly;
wherein the control, via processing at the data processor of radar data captured by the radar assembly, detects movement of a body part of an occupant present in the cabin of the vehicle;
wherein the control, responsive to detecting movement of the body part of the occupant present in the cabin of the vehicle, generates a control command associated with at least one operation of the vehicle; and
wherein the at least one radar transmit antenna comprises at least one stepped lens, and wherein the at least one stepped lens focuses the transmitted radar waves to a plurality of hotspot zones in the vehicle.

23. The vehicular cabin monitoring system of claim 1, wherein the control, via processing at the data processor of radar data captured by said radar assembly, identifies movement of the body part of the occupant present in the cabin of the vehicle by determining whether the detected movement of the body part matches a particular movement from a stored set of movements.

24. The vehicular cabin monitoring system of claim 23, wherein the stored set of movements comprises data stored in memory accessible by the control.

25. A vehicular cabin monitoring system, the vehicular cabin monitoring system comprising:
a radar assembly disposed in a cabin of a vehicle equipped with the vehicular cabin monitoring system, the radar assembly operable to capture radar data;
wherein the radar assembly is housed in a mirror head of an interior rearview mirror assembly of the vehicle;
wherein the radar assembly comprises at least one radar transmit antenna that is operable to transmit radar waves;
wherein the radar assembly comprises at least one radar receive antenna that is operable to receive radar waves;
a control comprising a data processor for processing radar data captured by the radar assembly;
wherein the control is electrically coupled to a vehicle communication bus of the vehicle;
wherein the control, via processing at the data processor of radar data captured by the radar assembly, identifies movement of the head of an occupant present in the cabin of the vehicle; and
wherein the control, responsive to identifying movement of the head of the occupant present in the cabin of the vehicle, generates a control command associated with at least one operation of the vehicle.

26. The vehicular cabin monitoring system of claim 25, wherein the radar assembly is disposed behind a mirror reflective element of the mirror head of the interior rearview mirror assembly of the vehicle.

27. The vehicular cabin monitoring system of claim 25, wherein the control, responsive to processing at the data processor of radar data captured by the radar assembly, determines an orientation of the interior rearview mirror assembly relative to an interior portion of the cabin of the vehicle.

28. The vehicular cabin monitoring system of claim 27, wherein the control calibrates the vehicular cabin monitoring system to accommodate the determined orientation of the interior rearview mirror assembly relative to the interior portion of the cabin of the vehicle.

29. The vehicular cabin monitoring system of claim 25, wherein the at least one operation of the vehicle comprises at least one selected from the group consisting of (i) locking, unlocking, opening or closing a window of the vehicle, (ii) starting an engine of the vehicle, and (iii) opening a gas tank of the vehicle.

30. The vehicular cabin monitoring system of claim 25, wherein the at least one operation of the vehicle comprises at least one selected from the group consisting of (i) increasing volume of a head unit of the vehicle and (ii) changing a channel of a head unit of the vehicle.

31. The vehicular cabin monitoring system of claim 25, wherein the control, via processing at the data processor of radar data captured by said radar assembly, identifies movement of the head of the occupant present in the cabin of the vehicle by determining whether the movement of the head of the occupant matches a particular head movement from a stored set of head movements.

32. The vehicular cabin monitoring system of claim 31, wherein the stored set of head movements comprises data stored in memory accessible by the control.

33. A vehicular cabin monitoring system, the vehicular cabin monitoring system comprising:

a radar assembly disposed in a cabin of a vehicle equipped with the vehicular cabin monitoring system, the radar assembly operable to capture radar data;

wherein the radar assembly is housed in a mirror head of an interior rearview mirror assembly of the vehicle;

wherein the radar assembly comprises at least one radar transmit antenna that is operable to transmit radar waves;

wherein the radar assembly comprises at least one radar receive antenna that is operable to receive radar waves;

a control comprising a data processor for processing radar data captured by the radar assembly;

wherein the control is electrically coupled to a vehicle communication bus of the vehicle;

wherein the control, via processing at the data processor of radar data captured by the radar assembly, identifies a facial feature of an occupant present in the cabin of the vehicle and identifies movement of the facial feature of the occupant; and wherein the control, responsive to identification of the facial feature of the occupant and identification of movement of the facial feature made by the occupant present in the cabin of the vehicle, generates a control command associated with at least one operation of the vehicle.

34. The vehicular cabin monitoring system of claim 33, wherein the radar assembly is disposed behind a mirror reflective element of the mirror head of the interior rearview mirror assembly of the vehicle.

35. The vehicular cabin monitoring system of claim 33, wherein the control, responsive to processing at the data processor of radar data captured by the radar assembly, determines an orientation of the interior rearview mirror assembly relative to an interior portion of the cabin of the vehicle.

36. The vehicular cabin monitoring system of claim 35, wherein the control calibrates the vehicular cabin monitoring system to accommodate the determined orientation of the interior rearview mirror assembly relative to the interior portion of the cabin of the vehicle.

37. The vehicular cabin monitoring system of claim 33, wherein the at least one operation of the vehicle comprises at least one selected from the group consisting of (i) locking, unlocking, opening or closing a window of the vehicle, (ii) starting an engine of the vehicle, and (iii) opening a gas tank of the vehicle.

38. The vehicular cabin monitoring system of claim 33, wherein the at least one operation of the vehicle comprises at least one selected from the group consisting of (i) increasing volume of a head unit of the vehicle and (ii) changing a channel of a head unit of the vehicle.

39. The vehicular cabin monitoring system of claim 33, wherein the control, via processing at the data processor of radar data captured by said radar assembly, identifies movement of the facial feature of the occupant present in the cabin of the vehicle by determining whether the movement of the facial feature of the occupant matches a particular facial feature movement from a stored set of facial feature movements.

40. The vehicular cabin monitoring system of claim 39, wherein the stored set of facial feature movements comprises data stored in memory accessible by the control.

\* \* \* \* \*